Dec. 30, 1969 W. T. DAVIS 3,487,097
PROCESS FOR PRODUCING TRIALKYL ALUMINUM AND
ALUMINUM TRIALKOXIDES
Filed April 29, 1968 7 Sheets-Sheet 5

United States Patent Office 3,487,097
Patented Dec. 30, 1969

3,487,097
PROCESS FOR PRODUCING TRIALKYL ALUMINUM AND ALUMINUM TRIALKOXIDES
Wayne T. Davis, Baton Rouge, La., assignor to Ethyl Corporation, New York, N.Y., a corporation of Virginia
Continuation-in-part of application Ser. No. 311,706, Sept. 26, 1963. This application Apr. 29, 1968, Ser. No. 725,120
The portion of the term of the patent subsequent to May 21, 1985, has been dedicated to the Public
Int. Cl. C07f 5/06
U.S. Cl. 260—448        2 Claims

ABSTRACT OF THE DISCLOSURE

This invention discloses preferred methods of producing molecular weight peaking in the production of organo-aluminum compounds, particularly alkyl aluminum compounds and alkoxy aluminum compounds by processing involving chain growth, and plural displacements with olefins. Emphasized herein are combined aspects which maintain high vinyl purity of the olefins in the alkyl processing, the olefins manipulations and in the conversion of alkyl aluminum compounds to alkoxy aluminum compounds.

CROSS REFERENCE TO RELATED APPLICATIONS

This application is a continuation-in-part of application Ser. No. 311,706, filed Sept. 26, 1963, and now U.S. Patent No. 3,384,651, which in turn is a continuation-in-part of two abandoned parent applications; Ser. No. 234,339, filed Oct. 31, 1962 and Ser. No. 244,102, filed Dec. 12, 1962.

This invention relates to manufacture of trialkyl aluminum and trialkoxy aluminum compounds. More particularly, the invention relates to a new process for the production of products or streams having higher alkyl groups therein, having controlled chain lengths, i.e., numbers of carbon atoms per alkyl group.

Of recent years, the production of trialkyl aluminum compounds has substantially increased, owing to improved processes wherein the trialkyl aluminum compounds can be readily generated from an olefin, aluminum, and hydrogen. Improvements have also been presented for the manufacture of trialkyl aluminum compounds from an alkyl chloride and aluminum metal. Triethyl aluminum is the outstanding trialkyl aluminum material, because it is readily generated from aluminum, hydrogen, and ethylene, as the net reactants. Such a process can be carried out in two separate stages, or can be carried out in one single reaction stage. Thus, see Patents 2,787,626 and 2,885,314. Tri-n-propyl aluminum and tri-butyl aluminum can similarly be efficiently manufactured.

Corresponding processes using higher normal alpha olefins are possible, but have not been widely used, partly because straight chain alpha olefins are much less available than the low molecular weight gaseous olefins, and also because considerable difficulty occurs with respect to isomerizing or dimerizing at reaction conditions.

The trialkyl aluminum compounds, particularly triethyl aluminum, can be readily converted to a mixture of higher alkyl trialkyl aluminum products by chain growth reaction. Such a reaction is disclosed by Ziegler et al. Patent 2,826,598. Thus, by reacting triethyl aluminum and a plurality of moles of ethylene, one can readily generate a mixture of trialkyl aluminum compounds including butyl, hexyl, octyl, etc. alkyl groups. It will be apparent that the individual alkyl groups vary by two carbon atoms as the adding unit is ethylene. When alkyl groups having an uneven number of carbon atoms are desired, the starting trialkyl aluminum material would then be a compound having an odd number of carbon atoms in the alkyl groups, for example, tri-n-propyl aluminum.

Despite the ability to carry out chain growth reactions, generally, chain growth has left much to be desired with respect to the specificity of the reaction. Thus, although it is possible to provide a chain growth product peaking in specific alkyl group ranges, it has not been possible to concurrently control the relative quantity of any alkyl groups. These deficiencies occur because, insofar as the chain growth reaction is concerned, every alkyl group present, in a reacting trialkyl aluminum mixture, is equivalent. Thus, the ethylene reacts indiscriminately, and a statistical addition is arrived at. Thus, when an average of five ethylene molecules for each ethyl group are reacted, the product trialkyl aluminum is not tridodecyl aluminum, but contains a mixture resultant from a statistical addition of ethylene to all aluminum alkyl bonds existing during the course of the reaction. Hence, the effluent from such a chain growth operation will include uncontrolled quantities of alkyl groups both lower than and higher than the dodecyl group. The foregoing weaknesses are particularly disadvantageous when it is desired to convert the trialkyl aluminum to an additional product, such as primary alcohols. Heretofore, then it has not been possible to efficiently convert a low alkyl trialkyl aluminum material to a high alkyl trialkyl aluminum product, with any real controllability as to product composition.

Not only is the prior art deficient in that chain grown trialkyl aluminum compounds cannot be made with a good yield and a high degree of specificity, but it is extremely difficult to separate a trialkyl aluminum fraction from a chain growth mixture, having a statistical distribution of alkyl chain lengths, on the basis of the alkyl group length.

The object of the present invention is to provide a new and novel process for the conversion of lower alkyl aluminum materials and ethylene to high alkyl-trialkyl aluminum materials. An object of substantially all embodiments is to provide such an improved process wherein the net proportion of particular chain length ranges of alkyl groups of a trialkyl aluminum product is greatly increased. The object of specific utilizations of the invention which exhibit additional particular advantages is to combine the production of a trialkyl aluminum material, having said controlled alkyl groups, plus its conversion to a further product, specifically the normal primary alcohols corresponding to the alkyl groups.

Among numerous features disclosed in this in regard to the present process are the coordination with other inventions relating to the preservation of high vinyl purity in olefins streams and the separation of olefins from partially oxidized aluminum alkyl materials to avoid catalytic degradation of olefins in admixture with aluminum trialkyl compounds at elevated temperatures.

In the following definition, description, and examples, the term "high alkyl-trialkyl aluminum" refers to trialkyl aluminum materials having alkyl groups having a desired range of number of carbon atoms. According to the necessities of any particular embodiment, it will be seen that the term can include, illustratively, streams predominating in 8 through 12 carbon atom alkyl groups. In other cases, and more frequently, the high alkyl streams predominate in alkyls of 12 through 18 carbon atoms. Further, dependent upon the requirements of any explicit embodiment, the product mixture can include alkyl radicals of a limited span or a wide span, and in varying proportion. In certain instances, the performance of an embodiment of the invention can be measured by the gross yield of alkyl groups of from 10 to 22 carbon atoms. In other cases, it will be desired to obtain a product having predominantly alkyl groups of from 12 to 16 carbon atoms. In extreme cases, the desired trialkyl aluminum product can consist essentially only of two, or even one, alkyl aluminum moiety. For example, the principles of the invention are fully applicable to generate a relatively high purity tridodecyl aluminum, or, for example, a stream consisting essentially of tetradecyl and hexadecyl aluminum moieties. The term "low alkyl-trialkyl aluminum material" refers to the feed materials and is also used with reference to intermediate streams, which are relatively high in alkyl groups of fewer carbon atoms than the desired products. The feed trialkyl aluminum used most frequently is triethyl aluminum. Diethyl aluminum hydride, which is readily converted in the presence of ethylene to triethyl aluminum is also frequently desirable. Other low alkyl-trialkyl aluminum materials such as tri-n-propyl aluminum, tri-n-butyl aluminum, or tri-n-hexyl aluminum are also readily suitable as feed materials. The term "alkyl aluminum moieties," sometimes used herein, refers to the fragment of a trialkyl aluminum molecular species having only one alkyl group, and is expressed as Ral, wherein al is one-third atom equivalent of aluminum.

It will be clear that the term "trialkyl aluminum" does not exclude materials readily convertible under process conditions to trialkyl aluminum compounds, thus alkyl aluminum hydrides will usually be present in the stream in small but detectable amounts. Similarly, the term "trialkyl" does not imply that the compounds present are necessarily those wherein all alkyls in a particular molecule are identical.

The term "low olefins," as used herein, refer generally to olefins, other than ethylene, predominating in olefins having fewer carbon atoms than the alkyl groups of the desired product. "High olefins" generally means olefins having carbon atoms equal in number to the desired product alkyl groups.

All forms of the present invention are characterized by the use of a "rotating" supply of olefins, viz., a more or less permanent inventory of olefins of various molecular weight ranges. This supply of olefins is separated, by fractionation, into two or more streams of reactant supplies, one relatively concentrated in high olefins and one relatively concentrated in low olefins, which are used in at least two displacement reactions. Displacement reactions involve the substitution of alkyl groups existing on alkyl aluminum feeds by new alkyl groups corresponding to the olefin reactants. In one of the displacement reactions, the concentrated low olefins stream is employed in reacting by displacement with a trialkyl aluminum chain growth product having a statistical distribution of alkyl groups, and produces thereby a trialkyl aluminum displacement product enriched in lower alkyl groups, and at the same time the olefins obtained from the displacement reaction are enriched in higher olefin compounds. In the second displacement reaction, the olefin stream concentrated in higher olefins is reacted with a trialkyl aluminum chain growth product, sometimes having a statistical distribution of alkyl groups, whereby a displacement product mixture is obtained including a mixture of trialkyl aluminum compounds enriched in alkyl groups of higher chain length, and a mixture of olefins, which are enriched in the lower olefin. The olefins released or discharged from both of the said displacement reactions are recovered and again fractionated into concentrated low olefin and concentrated high olefin streams. It will be seen that in all forms of the invention, a circulating supply of olefins is thus employed in the two displacement processes, and that fractionation operations can be limited exclusive to the mixtures of olefins in the effluents from the displacement reactions. As a result of the utilization of the above described general procedure, it is no longer necessary to attempt to segregate alkyl aluminum compounds according to the alkyl aluminum moieties, but nevertheless, a trialkyl aluminum product is derived wherein the identity, distribution and length of the alkyl groups is controlled virtually at will.

Generally, the moles of low olefins released in the one displacement replace and equal the low olefins consumed (by forming alkyl groups) in a second displacement. There is, therefore, no necessity of replenishing the molar inventory of olefins except to compensate for losses in handling, and losses by purging of minor amounts of branched chain olefin by-products and olefins of higher chain length than desired for the alkyl groups.

A number of particular embodiments of the above defined invention are available and have particular individual benefits for specific situations.

One particular embodiment employs two chain growth operations. In said class of embodiments, a low alkyl-trialkyl aluminum feed, typically triethyl aluminum or the like, is subjected to chain growth. The resultant chain growth product is thereafter reacted with a low olefin displacing stream, whereby the trialkyl aluminum mixture in the displacement product is enriched or increased in concentration in the lower alkyl groups. At least a portion of said low alkyl-trialkyl aluminum displacement product is then subjected to a second chain growth treatment with ethylene, producing a second chain growth product having an increased average length of alkyl groups. At least a portion of the second chain growth product is then subjected to displacement with a concentrated high olefin stream, whereby a trialkyl aluminum displacement product is obtained enriched in the higher alkyl groups.

The second above-mentioned trialkyl aluminum mixture, is in said class of embodiments, the desired product, and can be separated from the olefins accompanying the displacement product effluent for ultization as such in subsequent processing. Alternatively, as will be described hereinafter, intermediate treatment steps can be provided which further facilitate the overall objective of the process in making it possible to more efficiently separate the mixture of olefins accompanying the trialkyl aluminum mixture from the displacement process.

A significant benefit of the process is that the identity of the alkyl groups produced can be controlled. Further, the relative proportions can be controlled. Thus, for example, the relative proportions of dodecyl and tetradodecyl groups can be controlled. Additionally, when desired, it is entirely feasible to generate a product having twin peak concentration components not adjacent in chain length. Thus, for example, one can generate a trialkyl aluminum product wherein the major alkyl groups are octyl and dodecyl, with a much lower concentration of the decyl groups.

An additional class of embodiments again involves a chain growth reaction processing a low alkyl, trialkyl aluminum fresh feed, but, in this class of operations, the fresh trialkyl aluminum feed is mixed and concurrently processed with, by chain growth, a low alkyl-trialkyl aluminum recycle stream. The chain growth product derived by this chain growth operation is then divided into two portions, termed A and B portions. These portions constitute the separate feeds to two displacement reactions steps, wherein, in the A displacement, a low olefins displacing stream is used in substantial excess, and wherein, in the B displacement reaction, the displacement olefin stream usually also in excess is concentrated in higher olefins. Again, the olefin mixtures derived from the above mentioned several displacement reactions are recovered from the effluents, and from these mixtures are again obtained fractionated streams including a stream concentrated in low olefins, for return to the A displacement, and a high olefins stream for feeding to the B displacement reaction step.

Yet another class of embodiments again involves the chain growth of a low alkyl-trialkyl aluminum fresh feed, and processing by displacement the resultant chain growth product with a higher olefins displacement stream to generate a high alkyl-trialkyl aluminum product. Concurrently, in a parallel system, a supply of trialkyl aluminum of relatively low alkyl group lengths, is subjected to chain growth with ethylene to produce a second chain growth product, which product is subjected to displacement by low olefins displacement mixture. As a consequence, an olefins mixture is derived enriched in higher olefins corresponding to displaced alkyl groups, and a low alkyl-trialkyl aluminum mixture is derived, which mixture is recycled, at least in part, to the mentioned second chain growth operation. The olefins from the displacement reaction are again recovered, and these, as well as the olefins from the first displacement reaction are fractionated to provide the desired high olefins and low olefins streams for the displacement reaction. In this class of embodiments, it will be seen that not only is a rotating or olefins inventory employed, but also the embodiment involves the circulation for processing purposes of an inventory of trialkyl aluminum components. In other words, trialkyl aluminum from the primary displacement is not fed to the second chain growth step of the second displacement step, except, if desired, to compensate for mechanical handling losses.

A further class of embodiments of the present invention involving the rotating inventory of olefins involves further three or more sets of growth and displacement operations rather than only the two such sets heretofore emphasized.

The details of carrying out the several embodiments of the process within the scope of the invention will be more readily understood from the following working examples, and from the figures, wherein FIG. 1 is a schematic representation illustrating in simplified form a general expression of the invention, FIG. 2 is a schematic flow sheet illustrating a particular embodiment of the invention utilizing two chain growth reactions, FIG. 3 is a flow sheet illustrating an additional embodiment wherein only one chain growth processing step is involved, and FIG. 4 is a schematic illustration representing a last embodiment employing a parallel trialkyl aluminum circulation loop as last generally mentioned above.

Figure 1:
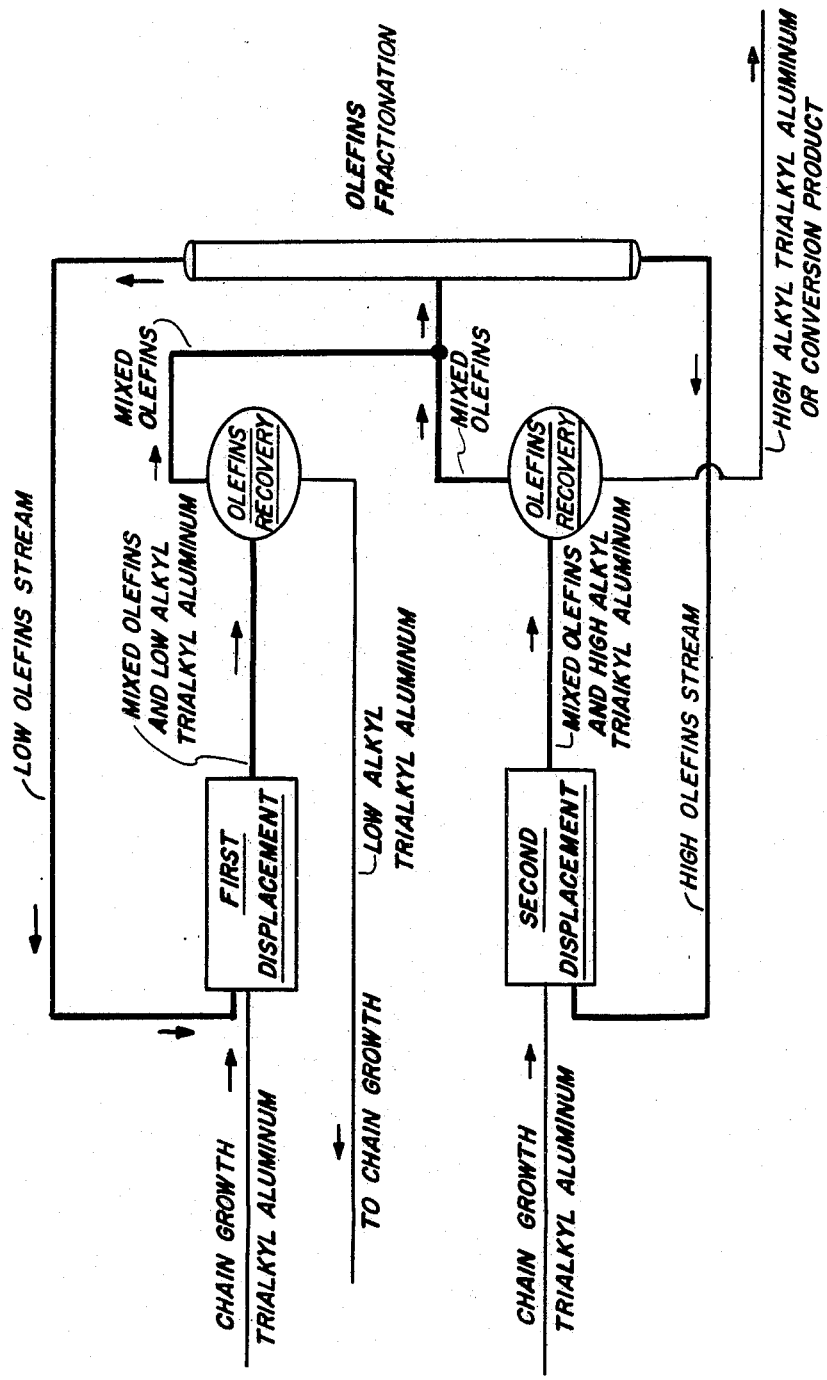

Referring firstly to FIG. 1, this is a simplified schematic representation showing interrelation of operations common to each embodiment of the process, wherein the heavy lines indicate the circulating olefins stream or inventory. As previously indicated, a relatively constant quantity of olefins, in terms of moles, is kept in circulation at all times. In practice, considering the overall results of the embodiments, ethylene is selectively converted to a limited number of alkyl groups in a predicted and restricted chain length range, according to requirements of the process, and these are discharged or utilized as aluminum alkyls for subsequent processing, or for separation as such. However, despite this migration, overall, of ethylene feed to alkyl groups of aluminum alkyl product, an olefin flywheel or loop is utilized having approximately a constant number of moles. The particular quantity is of no consequence, with reference to the total inventory at any particular time, but, as the displacement operations employed utilize a substantial molal excess of olefins, the olefin inventory is usually relatively high compared to the trialkyl aluminum in process inventory.

Referring to FIG. 1, it is seen that a chain growth aluminum alkyl product, from a preceding chain growth operation, is fed to a first displacement operation, wherein it is subjected to the reaction of an olefin stream predominating in low molecular weight olefins. As a result of the displacement reaction, the effluent contains aluminum trialkyl aluminum materials enriched in the lower alkyl groups, whereas the olefin mixture discharged concurrently therewith is enriched in higher alkyl groups which have been displaced. Following the said first displacement, there is a separation operation wherein the olefins are recovered. An additional and second displacement operation is also fed by a chain growth product, viz., a trialkyl aluminum stream produced by the addition of a plurality of moles of ethylene to a trialkyl aluminum feed. Again, this feed material is subjected to a displacement operation, utilizing as reactant an olefins stream concentrated in the higher molecular weight olefin corresponding to desired alkyl groups. In both of the above mentioned displacement operations, the relative proportions of olefins to aluminum alkyls is relatively high, expressed in moles per mole of alkyl group present. In fact, the higher the ratio provided, the greater the opportunity for specificity and restriction of purity of the trialkyl aluminum present in the displacement reactor effluent. Again, as a result of the displacement reaction carried out in the second displacement reactor, a reactor effluent including high alkyl trialkyl aluminum components, and an olefin mixture somewhat enriched in the lower olefin components displaced, is engendered. The olefins are recovered in a recovery operation, and are then fractionated or divided into two fractions, either in parallel or concurrently with the olefin mixture from the first displacement effluent olefin recovery, thus producing a supply of low olefins and a supply of high olefins for circulating back to the displacement operations as already described.

In all embodiments of the invention, the olefins recovered are fractionated into low and high olefins streams. Normally, multi-plate distillation columns are used, but it will be understood that the term "fractionate" includes functionally equivalent modes of separating olefins according to molecular weight. For example, selective adsorption on solid high surface adsorbents could be employed, or crystallizing the higher olefin components.

The feeds to the displacement operations, as already indicated, include, in all instances, a chain growth trialkyl aluminum product. As will be evident from the preceding discussion of various classes of embodiments, and by the detailed illustrations hereinafter, said chain growth feeds can be the same in composition, or can be substantially different. In some cases, the trialkyl aluminum in one segment of the process will, as in the case of the olefins, be, in effect, a circulating medium for achieving a process objective.

Figure 2:
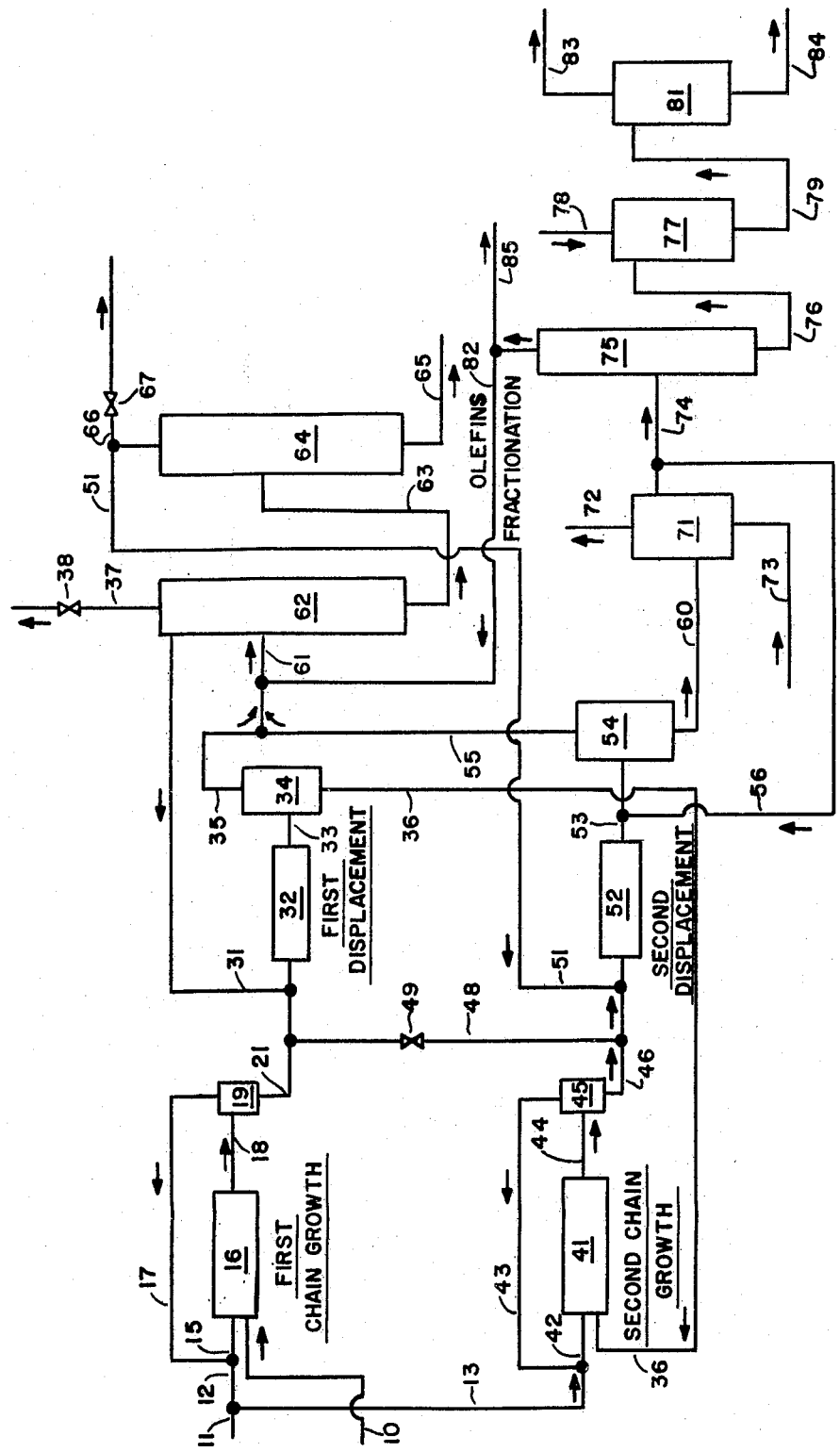

As previously stated, FIG. 2 is a schematic illustration of a process utilizing the class of embodiments wherein two separate chain growth reactions are utilized in conjunction with the two displacements present in all forms of the invention. Referring to FIG. 2, an installation is shown also incorporating and utilizing, in unison with the basic process, supplemental reactions wherein the trialkyl aluminum product of specific characteristics is converted to a further product consisting of normal alcohols corresponding to the alkyl groups of the trialkyl aluminum materials. The major sections of the installation include a first chain growth sections, a first displacement section with a first vaporizer portion, a second chain growth section and a second displacement section with olefin recovering apparatus associated therewith, and an olefin fractionation section. An alcohol manufacturing section is also shown. In this embodiment the olefin fractionation equipment is merged or combined for processing concurrently the several olefin streams, or part of the streams, released in the displacement operations. Ancillary apparatus such as condensors, pumps and valves are omitted from FIG. 2.

The ethylene supply to the plant is through line 11, which branches into two parts 12, 13, feeding the first chain growth section and the second chain growth section, respectively. A first chain growth reactor 16 is provided to receive ethylene through the feed manifold 15 which joins the branch ethylene feed line 12 and a recycle line 17. The net feed of low alkyl-trialkyl aluminum material is provided through feed line 10, connecting to the first chain growth reactor 16. The discharge line 18 from the first chain growth reactor passes to a knock-out drum 19. An overhead recycle line 17 is provided to transmit excess unreacted ethylene, a bottoms line 21 being provided for transfer of non-vaporized, predominantly trialkyl aluminum materials. The bottoms line 21 is joined by a first olefins line 31 and then passes to the first displacement reactor 32. Discharge line 33 from the first displacement reactor 32 connects to a vaporizer 34, having an overhead line 35 and a bottoms line 36. The bottoms line 36 connects to the second chain growth reactor 41, which is also fed by an ethylene line 42, which in turn is essentially a manifold combining a recycle line 43 and the ethylene net feed line 13. An effluent line 44, from the second chain growth reactor 41, connects to a flash vessel or knock-out drum 45. A cross-over line 48, fitted with a control valve 49 is provided for crossover when necessary of some of the second chain growth product to feed to the first displacement reactor 32, or of the first chain growth product to the second displacement reactor. The bottoms line 46 from the knock-out drum 45 passes to the second displacement reactor 52, and is joined by a second olefins feed line 51. The effluent line 53 from the second displacement reactor 52 is joined by a recirculation line 56, which provides an oxidized alkyl aluminum stream from a subsequent oxidation section. The mixture passes through line 53 to an olefin vaporizing vessel 54, from which an overhead line 55 and a bottoms line 60 are provided for transfer of the respective streams. The overhead line 55 joins with the overhead line 35 from the first vaporizer 34, forming a mixed olefins line 61, passing to a first fractionator 62. A light overhead cut from said fractionator is transmitted by the first olefins line 31. An overhead line 37 is provided with a control valve 38 for purge of light olefins from the plant when desired. The bottoms line 63 from the first fractionator 62 passes to the second fractionator 64. The overhead line 51 from the second fractionator 64 is the second olefins line connected to the second displacement reactor 52, a branch or purge line 66 being provided, having a control valve 67. A bottoms line 65 from the second fractionator 64 discharges from the installation.

The bottoms line 60 from the second vaporizer 54 passes to oxidizer 71. An overhead line 72 is provided from the oxidizer, and feed line 73 is provided for a gaseous oxidizing agent such as oxygen or air. An oxidized stream discharge line 74 passes to an olefins column 75. An overhead line 82 from the olefins column 75 connects to feed line 61 to the first olefins fractionating column 62, for feed back of olefins, although in preferred embodiments the quantity of olefins separated is quite low, and a purge line 85 is more commonly employed. The bottoms line 76 connects to a hydrolyzing unit 77. A hydrolyzing liquid feed line 78 also feeds the hydrolyzer unit 77 and a discharge line 79 is connected to a final purification tower 81, from an overhead product line 83 and a residue line 84 discharge.

The following working example is an embodiment directed to production of a trialkyl aluminum product stream concentrated in dodecyl through octadecyl aluminum moieties. Further, in this embodiment, the trialkyl aluminum product is integrated with the conversion to alcohol products.

Example 1

Triethyl aluminum is fed through line 10 to the first chain growth reactor 16 and ethylene is supplied through line 12, being joined by recycled ethylene provided through line 17 to the feed manifold 15. The net ethylene reacted in the first chain growth reactor is 13.5 moles per mole of triethyl aluminum fed, amounting to about four-fifths of the total ethylene reacted in the process. The effluent from the chain growth reactor, contains trialkyl aluminum components having the following alkyl aluminum mole distribution:

| Alkyl aluminum component: | Mole percent |
|---|---|
| Ethyl | 1 |
| Butyl | 5 |
| Hexyl | 11 |
| Octyl | 17 |
| Decyl | 19 |
| Dodecyl | 17 |
| Tetradecyl | 13 |
| Hexadecyl | 8 |
| Octadecyl | 4.6 |
| Eicosyl and higher | 4 |

Excess ethylene accompanying the foregoing trialkyl aluminum product is flashed in the knock-out drum 19 and recycled through line 17. The trialkyl aluminum stream then is passed through line 21 to the first displacement reactor 32, being joined by the first olefin stream through line 31 in proportions of about 17 to 18 moles per mole of the trialkyl aluminum mixture. A typical composition of the first olefins stream is as follows:

| Olefin: | Mole percent |
|---|---|
| Butene | 9 |
| Hexene | 21 |
| Octene | 32 |
| Decene | 38 |

It is seen that the first olefin displacement stream consists essentially of olefins below a desired key alkyl group, dodecyl, in chain length. The stream may be accompanied by small proportions of other olefins. The olefins consist essentially of the normal alpha olefins, but minor quantities of vinylidene or internal olefin isomers will normally be present. In the reaction in the first displacement reactor, the trialkyl aluminum mixture is enriched in alkyl aluminum compounds having lower-than-desired alkyl groups, viz., alkyl groups of 10 or less carbon atoms. Thus, feed to the first displacement reactor contains about 47 mole percent of alkyl groups of 12 and higher carbon atoms, but the discharged trialkyl aluminum components from the first displacement reactor has this proportion drastically reduced to about 8 mole percent. Similarly, the displacement reaction then enriches the olefins, accompanying the trialkyl aluminum in the discharge mixture, in olefins of 12 and higher carbon atoms. The percentage concentration enrichment is by no means as perceptible owing to the use of a relatively high ratio of olefins to trialkyl aluminum feed to this reaction step. Thus, the olefins in the effluent from the first displacement reactor 32 have the folowing approximate composition:

| Olefin: | Mole percent |
|---|---|
| Butene | 9 |
| Hexene | 19 |
| Octene | 30 |
| Decene | 35 |
| Dodecene | 3 |
| Tetradecene | 2 |
| Hexadecene | 1 |
| Octadecene and higher | 0.7 |

The mixture from the first displacement reaction then passes to the separator 34 for vaporization of a large percent of the olefins, leaving as bottoms the trialkyl aluminum components accompanied by very minor amounts of the higher molecular weight olefins, over 90 percent of the olefins being separated and discharged through line 35. The bottoms are discharged through line 36 and provide a feed to the second chain growth reactor 41. Also introduced to the second chain growth reactor is ethylene in line 42, made up in part of fresh ethylene supplied by line 13 and recycled ethylene supplied through line 43. The net ethylene feed to the second chain growth reactor is in the proportions of about 3½ to 4 moles per mole of the trialkyl aluminum portion. The mixture generated by this chain growth reaction is appreciably enriched in the higher alkyl aluminum components, having the approximate following composition:

| Alkyl aluminum component: | Mole percent |
| --- | --- |
| Ethyl | 1 |
| Butyl | 3 |
| Hexyl | 8 |
| Octyl | 16 |
| Decyl | 23 |
| Dodecyl | 22 |
| Tetradecyl | 14 |
| Hexadecyl | 7 |
| Octadecyl | 3 |
| Eicosyl and higher | 2 |

The feed and the effluent to and from the second chain growth reactor 41 also includes minor proportions of higher olefins accompanying the trialkyl aluminum stream used as a reactant, these being the olefins not separated by the flashing operation in the vaporizing chamber 34. These olefins amount to only several mole percent based on the trialkyl aluminum and are predominantly 14 or more carbon atom olefins.

After flashing excess ethylene in the flash chamber 45 for recycle through line 43, the trialkyl aluminum mixture (with minor quantities of olefins) pass through line 46, being joined by the second olefins stream provided through line 51, and providing the feeds to the second displacement reactor 52. The second olefins stream is concentrated in higher molecular weight olefins corresponding in chain length to the alkyl groups of the desired product. Thus, the displacement olefins provided through line 51 contain about 96 mole percent olefins of 12 through 18 carbon atoms, these again being substantially all normal alpha olefins. These olefins, as in the case of the first displacement reaction are provided in appreciable excess relative to the trialkyl aluminum material, viz, in proportions of about 8 to 9 moles per mole of trialkyl aluminum.

The displacement reaction results in the conversion in high yield of lower-than-desired alkyl groups of the trialkyl aluminum mixture fed to the second displacement reaction, to alkyl groups in the desired product range. A typical effluent from the second displacement reactor 52, in line 53, on an olefin free basis, will exhibit the following composition:

| Alkyl aluminum component: | Mole percent |
| --- | --- |
| Ethyl | 2.0 |
| Butyl | 1.2 |
| Hexyl | 2.8 |
| Octyl | 4.9 |
| Decyl | 9.6 |
| Dodecyl | 35.5 |
| Tetradecyl | 23.6 |
| Hexadecyl | 13.2 |
| Octadecyl | 6.3 |
| Eicosyl et al. | 1.2 |

As already indicated, the effluent stream from the displacement operation is immediately mixed with a recycled oxidized trialkyl aluminum stream provided through line 56. It has been discovered that the return of such a stream, having a composition varying from alkyl aluminum dialkoxide to aluminum trialkoxide, results in a rapid interchange of alkoxide and alkyl groups along the several components. As a result, it is possible to provide overall, a mixture wherein the aluminum containing components are dialkyl aluminum alkoxide compounds. Thus, if the recycled oxidation stream provided through line 56 is aluminum trialkoxide, it is recycled in proportions such that sufficient alkoxide groups are provided to convert all the aluminum compounents present to at least a monoalkoxide. Instead of using an aluminum trialkoxide stream, the recycled liquid can be a mixture of alkyl aluminum dialkoxides. It will be understood that the distribution of the alkyl moieties in both the trialkyl aluminum effluent and the recycled oxidation stream, are essentially the same.

The said mixing has the effect of immediately quenching any side reactions which might occur as a result of the high temperatures provided in the displacement reactor 52. Further, the alkyl aluminum alkoxide mixture resultant from this treatment permits more drastic temperature conditions in vaporizing and recovering the olefins of the effluent. The mixture is passed to the olefin vaporizer 54. A large segment of the olefins is vaporized therein, typically about three-fifths, and pass through line 55 to the feed 61 to the first fractionator 62. The fractionating columns 62, 64 provide the low and high olefins streams for the first and second displacement reactions respectively, through lines 31, 51.

The mixture of alkyl aluminum materials and higher olefins pass from the second flash operation in chamber 54 through transfer line 60 to the oxidizing section 71. An oxidizing gas is provided through line 73. Inerts, after the oxidation reaction are vented through line 72. The oxidizing operation converts the remaining alkyl aluminum moieties to the corresponding aluminum alkoxide so the overall approaches or approximates in composition aluminum trialkoxide. The column 75 discharges any olefins separated as an overhead stream through line 85, the aluminum trialkoxide being discharged as a bottoms through line 76, the bottoms passing to the hydrolysis reactor 77. In certain cases, only a partial recovery of olefins will be made in the vaporizer 54, and the aluminum components will be accompanied, through oxidation by a substantial portion of higher olefins. These are recovered in such instances, by column 75 and returned to colunm 62 through line 82.

The hydrolysis reactor is also fed through line 78 with an aqueous reactant such as dilute sulfuric acid and a reaction is therein conducted converting the aluminum trialkoxides to the corresponding alcohols and aluminum inorganic compounds, this being discharged as a slurry through line 79 to a separatory drum or column 81, wherein the alcohols are taken off overhead through line 83, as a relatively pure stream of mixed alcohols, leaving the aqueous phase of inorganic aluminum material for discharge through line 84. Alternatively, the column 81 can be used solely as a stratifying vessel, for settling out the aqueous phase.

The alcohol product obtained thereby will have the following approximate typical composition:

| Alcohol component: | Weight percent |
| --- | --- |
| Ethanol | <1 |
| Butanol | <1 |
| Hexanol | 1.5 |
| Octanol | 3.5 |
| Decanol | 8 |
| Dodecanol | 34 |
| Tetradecanol | 26 |
| Hexadecanol | 16 |
| Octadecanol | 8.8 |
| Eicosanol | 1.9 |

The foregoing alcohol mixture is readily further fractionated into individual compounds, or selected mixtures.

Yields of the trialkyl aluminum products, or, as in this example, alcohols generated therefrom, are quite high, being somewhat higher on the trialkyl aluminum feed than on the ethylene feed. Minor amounts of losses occur as high molecular olefin residues, discharged through line 65, or as purge streams through purge lines 37, 66, 85. These discharge streams can dissipate vinylidene olefin or internal olefin streams which may build up owing to side reactions in the chain growth reactions or the displacement reactions.

The alcohol product obtained by the foregoing operation exhibits a gross content of about 85 percent in the dodecanol through octadecanol fraction, the weight ratio of the dodecanol to tetradecanol being about 1.3:1. A particular feature of the present invention is that the internal proportions of a trialkyl aluminum products alkyl group (or of alcohols made therefrom) can be altered without adverse effects. The following example illustrates one such variation, resulting in an increase in relative proportions of the 12 and 14 carbon atom alkyl groups, and a decrease in the relative amounts of the 16 and 18 carbon atom groups.

Example 2

Operations in this example are the same as in Example 1, except that a portion of slightly over ¼ the trialkyl aluminum mixture from the second chain growth reaction is transferred through the cross-over line 48, to form part of the feed to the first displacement reactor 32. The relative feeds of ethylene to the two chain growth reactions are also changed. Thus, the proportion of total ethylene reacted is reduced to about 65 percent in the first chain-growth reaction. The ratios of the ethylene reacted in the first and second chain growth reactions are 11 and 4½ moles per mole of trialkyl aluminum processed.

The molal ratio of olefins to trialkyl aluminum to the displacement reactions are about 21–22/1, in the first displacement, and about 9/1 in the second, these ratios including small amounts of olefins accompanying the trialkyl aluminum portion.

As a result of these changes, the alcohol product stream obtained has the following composition:

Alcohol: Weight percent
- Ethanol _____ 0.3
- Butanol _____ 0.4
- Hexanol _____ 1.4
- Octanol _____ 3.2
- Decanol _____ 6.7
- Dodecanol _____ 37.4
- Tetradecanol _____ 26.8
- Hexadecanol _____ 15.4
- Octadecanol _____ 6.3
- Eiscosanol _____ 2.1

Comparison of the alcohol product obtained from Examples 1 and 2 show the flexibility associated with the process. The product from Example 2 has a weight ratio of dodecanol to tetradecanol of 1.4:1, compared with a corresponding ratio of 1.3:1 for the alcohols from Example 1. The proportions of alcohols in the preferred range, dodecanol through octadecanol, is slightly increased, from about 85 percent in Example 1 to about 86 percent in Example 2.

The benefits of the process are emphasized by comparison of the results which are obtained, as by the foregoing examples, with the results obtained from a conventional chain growth synthesis. Thus, a once-through reaction of triethyl aluminum with ethylene reacted in the same proportions as the total ethylene in Example 1 provides a trialkyl aluminum product of drastically different composition, as shown in the following table:

| Alkyl Aluminum Component | Alkyl Aluminum Concentration, Mole Percent | |
|---|---|---|
|  | Conventional Chain Growth | Example 1 |
| Ethyl | 0.3 | 2.1 |
| Butyl | 1.9 | 1.2 |
| Hexyl | 5.4 | 2.8 |
| Octyl | 10.3 | 4.9 |
| Decyl | 14.7 | 9.6 |
| Dodecyl | 16.8 | 35.5 |
| Tetradecyl | 15.9 | 23.6 |
| Hexadecyl | 13.0 | 13.2 |
| Octadecyl | 9.3 | 6.3 |
| Eicosyl and higher | 12.3 | 1.2 |

The profound benefits according to the present process are readily apparent from the above. Thus, the total quantity of alkyl groups in the 12 through 16 carbon atom range is increased from 45 to 72 mole percent, an increase of about 60 percent. Considering specifically the dodecyl aluminum moiety, the yield of this alkyl group is increased over 100 percent.

To illustrate more fully the variation in product compositions which is now possible, the following tables shows the product composition characteristics provided at various additional process conditions:

| Chain Growth Reaction Ethylene to R₃Al, Mole Ratio | | Second Chain Growth Product to First Displacement, Percent | Displacement Reactions Minimum Olefin: R₃Al, Mole Ratio | | Product R₃Al, Mole Percent | | Alcohol Product Dodecanol: Tetradecanol, Wt. Ratio |
|---|---|---|---|---|---|---|---|
| First | Second | | First | Second | Lower Than Dodecyl | Higher Than Octadecyl | |
| 13.5 | 4.2 | 0 | 1.7 | 2.6 | 14.4 | 9.0 | 1.13 |
|  |  | 0 | 17.5 | 13.2 | 8.7 | 5.6 | 1.28 |
| 13.5 |  | 0 | 28.5 | 27.6 | 5.1 | 4.6 | 1.31 |
| 11.25 | 4.2 | 0 | 19.2 | 2.3 | 27.6 | 2.7 | 1.42 |
|  | 5.4 | 0 | 19.2 | 4.0 | 17.8 | 4.0 | 1.26 |
| 12.75 | 4.2 | 0 | 28.6 | 7.45 | 13.7 | 4.1 | 1.33 |
| 13.5 | 4.8 | 0 | 17.2 | 34.6 | 3.6 | 6.3 | 1.21 |
| 11.4 | 4.2 | 26 | 21.0 | 8.6 | 18.2 | 1.4 | 1.33 |
| 9.3 | 3.3 | 48 | 21.0 | 8.6 | 21.3 | 0.7 | 1.63 |
| 8.4 | 2.4 | 65 | 21.0 | 8.7 | 24.5 | 0.4 | 2.0 |

The foregoing table illustrates the variation in operating factors when the range of alkyl groups in the desired product is 12–18, inclusive and 10–16. When a different range is desired—for example, decyl to tetradecyl alkyl groups—similar relationships exist.

From the foregoing examples and data, it is seen that the present process permits production in high yield of product alkyl groups concentrated or peaking in desired alkyls. Further, as demonstrated, the relative proportions of individual alkyls within the desired product range can be adjusted.

It will be noted that the trialkyl aluminum product stream will contain small but respectable portions of alkyl groups lower than the particularly preferred product range. These can be controlled or adjusted by varying the quantity of olefins to the displacement reactors, as shown by the preceding table. By building up the size of the second olefins stream, in Example 1, illustratively, to provide a ratio of about 18 moles per mole of trialkyl aluminum, the quantity of lower-than-dodecyl alkyl groups released by the second displacement reactor is reduced from about 17.6 to as low as 5 mole percent. An increase, or decrease, in the proportions of olefins fed to one displacement reaction must be accompanied by a corresponding change in the olefins and in the other displacement reactor. Generally, the quantity, in moles, of net olefins reacted in the two displacement reactors, must be approximately equal.

In the foregoing class of embodiments using two separate chain growth operations, the fraction of ethylene reacted in the first chain growth reaction is usually from one-fourth to nine-tenths, a preferred range being about one-half to about three-fourths. Where three-fourths is reacted in the first, about one-half of the final alkyl groups in the desired product range are generated in the first chain growth step. The mole proportion of olefins to aluminum alkyls is generally from 10–50:1, preferably 15–30:1.

The cross-over technique permits maintaining a constant olefin inventory regardless of desired product composition. Generally, the number of moles of higher olefins released in the first displacement must be equal to the number of moles of lower olefins released in the second displacement. Thus, as the desired dodecyl to tetradecyl ratio in the alkyl product is increased, the chain growing reaction must be terminated at a time when more lower alkyl groups still remain in the second chain growth product. Thus, more lower olefins are subsequently released in the second displacement reactor, requiring a greater release of higher olefins in the first displacement step. The cross-over of alkyl from the second chain growth to the first displacement provides higher alkyl groups for producing the required additional higher olefins.

The proportion of the second chain growth trialkyl aluminum diverted to the first displacement reaction, then, can be varied from zero to up to as high as about ¾ in some instances. A preferred range, in making alkyl aluminum groups of 12 through 18 carbon atoms, is from about ⅟₁₀ to ½, a preferred range being from about ⅕ to about ⅓.

In the foregoing examples, the low alkyl-trialkyl aluminum feed material has been uniformly illustrated as triethyl aluminum. It will be understood, as previously discussed, that other low alkyl-trialkyl aluminum materials, or even mixtures can be substituted for this explicit feed material. The same results will be achieved, except that the streams in general will have alkyl groups increased in chain length corresponding on the average to the difference of chain length of the trialkyl aluminum feed and the triethyl aluminum specifically illustrated. When mixtures are employed, the opportunity exists for developing products having alkyl groups separated by increments of one carbon atom instead of by two carbon atoms. Thus, when the feed trialkyl aluminum mixture contains equimolar proportions of alkyl groups of even and odd numbers of carbon atoms, then the several streams of the process will contain even and odd number components, resulting from addition to the starting components.

Figure 3:
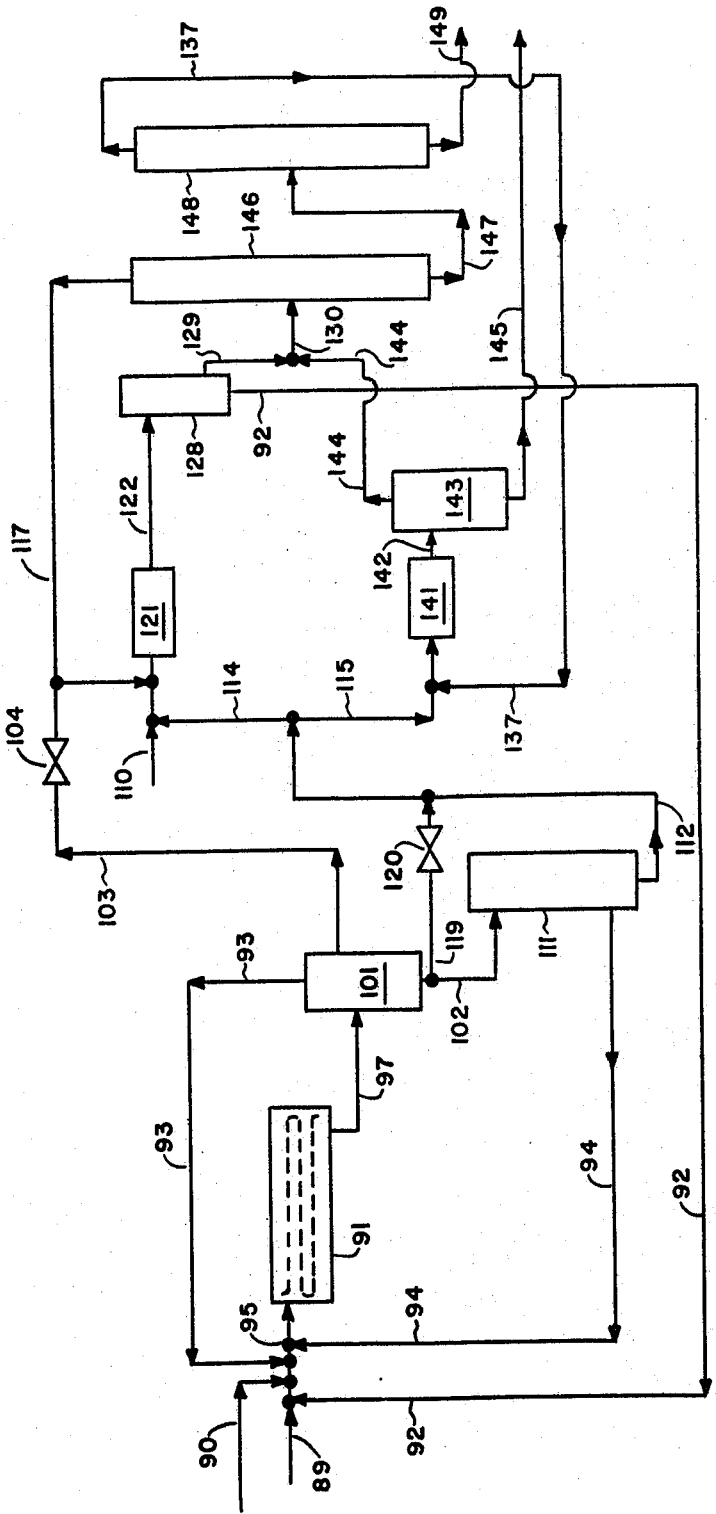

An additional particular class of embodiments are those in which the chain growth trialkyl aluminum stream is the same composition to each displacement reactor. A typical installation of such an embodiment is shown by FIG. 3. Referring to the figure, an ethylene feed 89 provides fresh ethylene, the low alkyl-trialkyl aluminum feed being in line 90. Recycle of excess ethylene and trialkyl aluminum streams are provided for by lines 92, 93, 94. Line 95 is a main feedline for the various components fed to reactor 91 through lines 89, 90, 92, 93 and 94.

A line 97 is for effluent from the chain growth reactor 91 and connects to a flash chamber section 101. In this embodiment a second flash chamber 111 is provided for a separation of a portion of the lower alkyl-trialkyl aluminum fraction from the spectrum of trialkyl compounds in the effluent from the chain growth reactor 91.

A by-pass line 103 is provided having a valve therein 104, whereby a portion of the olefin or light end stream separated in flash chamber 101 can be passed to a subsequent portion of the system. Normally this by-pass line 103 is not employed. An additional by-pass line 119 is provided, branching from the bottoms discharge line 102 from the flash chamber 101. This by-pass line is provided with a cut-off valve 120, which serves as a by-pass of second flash chamber 111.

A bottoms line 102 conducts the liquid phase from the first flash chamber 101 to the low pressure flash chamber 111. A liquid bottoms line 112 from the second flash chamber 111 passes the trialkyl aluminum material to subsequent operations. Branch lines 114, 115 are provided to transfer portions of the trialkyl aluminum mixture to the A displacement reactor 121 and the B displacement reactor 141, respectively. Line 110 is an input for blending additional or makeup olefins to displacement 121. Line 117 is provided to feed concurrently olefins to the A displacement reactor. The product stream from the A displacement reactor 121 is passed by a line 122 to a separation zone, having a vaporizer 128.

The trialkyl aluminum fraction fed by line 115 to displacement reactor 141 is reacted with olefins introduced by an olefin line 137, the effluent from the displacement reactor 141 passing through a discharge line 142.

The olefins separated from the products of the A and B displacement reactions are combined and fractionated to provide a low molecular weight olefin displacing stream and a high molecular weight olefin displacing stream. Thus, the effluent from the B displacement reactor 141 is passed through line 142 to a separator 143 operative at a low pressure and a temperature of about 240–250° F., from which a product line 145 conducts the desired trialkyl aluminum product, and an overhead olefins line 144 is provided to transfer the olefins separated therein. These olefin lines 129 and 144 then join at a feed line 130 to a first olefin fractionator 146. The overhead line 117 from this fractionator conducts low molecular weight olefins to the first or A displacement reactor 121. The bottoms from the first fractionator 146 are passed through a bottoms line 147 to a re-run or clean-up column 148. An overhead line 137 transmits olefins to the second or B displacement reactor 141, and a small amount of non-desired heavy end hydrocarbons are discharged through a line 149. The bottoms from 146 contain of the order of less than 1 mole percent of such heavies removed by column 148 through line 149.

Example 3

In a typical operation of this installation, the process is conducted to provide trialkyl aluminum products having alkyl groups approximately corresponding to the mole distribution of molecular species found in a center cut of naturally derived lauryl alcohol. Specifically, a trialkyl aluminum product is to be obtained having a high concentration of dodecyl, tetradecyl, and hexadecyl alkyl groups, the molal ratio of the dodecyl to tetradecyl alkyl moieties being approximately 3.8:1, or at least in the range of 3.0–4:1. The molal ratio of 3.8:1 yields an alcohol product having a weight ratio of 3.3 parts of dodecyl alcohol per part of tetradecyl alcohol. The total weight of dodecyl to hexadecyl alcohols in the product is about 80 weight percent, the balance being lower molecular weight straight chain alcohols.

In this operation a lower alkyl trialkyl aluminum mixture is fed by line 90 as the starting material, and fresh ethylene is provided through line 89. In addition, a low alkyl trialkyl aluminum stream is recycled through line 92, and excess ethylene is recycled through line 93.

To further define this operation, the following table shows typical stream compositions:

| | Trialkyl Aluminum Compositions, Mole Percent, Olefin Free Basis | | | |
|---|---|---|---|---|
| | Trialkyl Aluminum to Chain Growth Reactor | | | |
| Alkyl Aluminum Moiety | Fresh | Primary Recycle (92) [1] | Secondary Recycle (94) | Chain Growth Product (102) | Trialkyl Aluminum from "B" Displacement (142) |
| Ethyl | 22.3 | | 12.8 | 4.5 | |
| Butyl | 33.5 | 2.5 | 34.5 | 12.9 | 2.0 |
| Hexyl | 25.1 | 18.4 | 32.0 | 20.5 | 3.8 |
| Octyl | 12.6 | 36.8 | 15.2 | 24.7 | 7.6 |
| Decyl | [2] 6.4 | 39.7 | 4.4 | 23.2 | 8.2 |
| Dodecyl | | 1.7 | [2] 1.1 | 10.5 | 59.1 |
| Tetradecyl | | 0.5 | | 3.0 | 15.7 |
| Hexadecyl | | | | 0.6 | 3.6 |
| Octadecyl | | | | 0.1 | |

| Olefin | Olefin Compositions, Mole Percent, Trialkyl Aluminum Free Basis | | | |
|---|---|---|---|---|
| | Low Olefin Stream (117) | Olefins in "A" Displacement Effluent (122) | Higher Olefins Stream (137) | Olefins in "B" Displacement (142) |
| Butene | 2.5 | 2.5 | | 1.4 |
| Hexene | 19.0 | 18.4 | | 1.4 |
| Octene | 37.5 | 36.5 | | 7.0 |
| Decene | 40.5 | 39.5 | 6.0 | 17.7 |
| Dodecene | 0.5 | 2.2 | 70.0 | 53.8 |
| Tetradecene | | 0.5 | 20.1 | 15.6 |
| Hexadecene | | 0.1 | 3.9 | 3.0 |

[1] Trialkyl aluminum from "A" displacement.
[2] Includes higher components.

As shown, the chain growth product mixture is subjected to two successive flashing operations 101 and 111 at successively lower pressures. The first operation can be in several stages with the terminal conditions being relatively low pressure of the order of about 10 mm. of mercury and about 185° F. The lowest pressure operation 111 separates some of the lower trialkyl aluminum components, particularly triethyl aluminum, as overhead for recycling to the chain growth reactor 91. The so-resultant bottoms stream of trialkyl aluminum components, discharged through line 112 than has a composition in which about 80 mole percent of the alkyl aluminum moieties are below 12 carbon atoms, 20–21 mole percent are 12 and more carbon atom alkyl aluminum moieties and higher. A disadvantage of the alternate transmittal, by line 119, to the displacement operations of a stream having appreciable quantities of triethyl aluminum therein is the fact that triethyl aluminum is quite refractory to displacement by higher olefins, in contrast to the susceptibility of butyl and higher groups to displacement by higher olefins as is employed in the B displacement reaction in reactor 141. In addition, triethyl aluminum is particularly difficult to separate from some of the olefins present in the mixture produced by the A displacement reaction, and will therefore appear in the olefin fractionation column 146. The presence of alkyl aluminum in the fractionator 146 will cause isomerization of the olefins from normal alpha olefins to internal and branched chain olefins.

In the above example, vaporizing separations are employed to separate olefins from the trialkyl aluminum components of the displacement reaction effluents, but other operations can also be provided at, usually somewhat greater expense. When vaporizing operations are employed, it is usually highly desirable to substitute a plurality of stages for the single stage separation illustrated. Thus, instead of a single stage vaporizer 128, an even more efficient separation is accomplished by a three stage flashing separation, the stages being operated at approximately one-half atmosphere, one-twentieth atmosphere, and the final being at the lower pressure of only several millimeters mercury absolute pressure.

Among the alternatives to the flashing type of separations described are solvent extraction, wherein a selective solvent is employed to separate the olefin components from the trialkyl aluminum components, or crystallization at low temperatures, whereby the trialkyl aluminum components are selectively frozen out of the mixture.

It is discovered that the process of the invention allows highly effective control of the net products of the chain growing reaction to correspond to the desired alkyl aluminum moiety distribution in the trialkyl aluminum product delivered by the process, and of course, corresponding to this, the desired composition of the products derived by stoichiometric reaction of the resultant trialkyl aluminum material. By the latter is meant the composition of alcohols or the composition of alpha olefins which can be readily derived from the trialkyl aluminum product, such as is delivered through line 149.

By composition of the product is meant not only the range of chain lengths of alkyl aluminum groups, but also of the internal ratio of key components within such a mixture. Thus, in cases wherein the trialkyl aluminum is to be converted to alcohols suitable as a replacement for alcohols desired from coconut oil, it is desired that the alcohols contain about 80–85 weight percent in the dodecanol-hexadecanol range. Further, the weight ratio of dodecanol to tetradecanol alcohols should be about 2.6:1 to 2.8:1. It will be understood, of course, that the foregoing proportions of these particular components is not an inflexible requirement of the process, but is illustrative of a typical embodiment. Under some circumstances, it well may be desired to produce a trialkyl aluminum mixture having a molal ratio of dodecyl to tetradecyl alkyl groups of from 3:1 to 4:1, or even below or above these ratios. In other cases, different bands of alkyl aluminum moieties can be desired, with a resultant change in the key component. Thus, one might wish to manufacture a trialkyl aluminum product predominating in the decyl aluminum to tetradecyl aluminum moieties and the principles of the process are equally applicable to such embodiments.

It is found that the proportions of a key component in the desired product band, expressed as a molal ratio to the next highest component, is in general accordance with an equation of the type $$(MA/MB) = S \times (C_1/C_2) + N$$

wherein $MA/MB$ is the weight ratio of the divided portions of the trialkyl aluminum mixture to the A and B displacement reactions, respectively, $C_1/C_2$ is the desired weight ratio of the key alkyl aluminum moiety $C_1$, to the next moiety $C_2$, and N and S are numerical constants.

The particular value of the constants will vary somewhat according to the identity of the key components $C_1$ and $C_2$ and the selection of certain operating conditions. In a class of embodiments wherein the key group is dodecyl aluminum, $(C_{12}H_{25})Al$, and the next largest alkyl aluminum moiety is tetradecyl aluminum $(C_{14}H_{29})Al$, typical values are $S=1.56$ and $N=-2.12$. The resultant equation is then $$(MA/MB) = 1.56(C_{12}/C_{14}) - 2.12$$

Thus, for a weight ratio of about 3.25 parts dodecyl aluminum per part tetradecyl aluminum, the division of trialkyl aluminum streams to the A and B displacement reactors should be about 2.93:1. Expressed alternatively, about ¾ of the trialkyl aluminum mixture should be routed to the A displacement reaction at steady state operations to achieve the desired ratio.

It will be understood that the specific values for the constants of the foregoing relationship are not generally applicable in all possible embodiments of the invention, but are specific to the key component involved in the above working example. When other embodiments of the invention are performed which vary in appreciable degree as to certain of the process factors, the constants of the control equation will vary. Among the factors which can alter the precise value of the constants in the control equation are the composition of the fresh low alkyl-trialkyl aluminum feed provided to the chain growth reactor, the excess of olefins employed in the displacement reactors A and B and the spread and identity of alkyl aluminum components in the desired band. In any given example of this class of embodiments, the particular operating equation is readily determined and follows the foregoing general form. The constants will, generally be in the same order of magnitude when the relationship is expressed in terms of the mole ratio desired of the key component to the next higher component.

Of equal or even greater importance than the ratio of the key component to the next highest component, as discussed above, is the relative purity of the product in the desired alkyl aluminum band. In the working example, it will be noted that the product stream released through line 145 includes 78 mole percent dodecyl and higher alkyl aluminum moieties. When an appreciably higher concentration of dodecyl-and-higher alkyl aluminum moieties is desired in this stream, the excess of higher olefins provided to the B displacement reaction is increased. Thus, instead of a feed ratio of 7 moles of olefins per mole of trialkyl aluminum feed to the B displacement reactor 141, by doubling this ratio to about 14:1, the nondesired alkyl aluminum moieties will be reduced approximately one-third. Thus, a trialkyl aluminum stream having 85–86 percent dodecyl-hexadecyl alkyl aluminum moieties will be obtained, the lighter alkyl aluminum moieties being reduced to about 14 mole percent.

The identity of the fresh low alkyl trialkyl aluminum feed to the chain growth reaction of the process is important, but is not a critical limitation. Thus, instead of the feed employed in the foregoing working example, a relatively pure single trialkyl aluminum material can be provided such as triethyl aluminum, tri-n-butyl aluminum or tri-n-hexyl aluminum. When the alkyl groups are lower in carbon number than the average of the fresh feed illustrated, the control equation is shifted in the direction of a greater portion of trialkyl aluminum chain growth products being sent to the A displacement reaction, and the quantity of low alkyl-trialkyl aluminum components recycled to the chain growth step is similarly increased. Conversely, when the alkyl chain lengths of the fresh feed to the chain growth reactor are increased— for example, to tri-n-octyl aluminum, or an average of eight carbon atoms, a smaller proportion of the chain grown components will be sent to the A displacement reaction.

The fresh feed of lower alkyl-trialkyl aluminum component can contain alkyl groups having an odd number of carbon atoms. For example, the fresh feed can include tri-n-propyl aluminum, or tri-n-amyl aluminum. In such cases the process streams will include alkyl groups having adjacent alkyl groups, i.e., propyl, butyl, amyl, hexyl, etc., rather than alkyl groups varying by increments of two carbon atoms, as is the case when the fresh feed contains alkyl groups having only even numbers of carbon atoms.

In the working example, the preferred method was illustrated wherein olefins from both the A and B displacement operations are blended and then are fractionally distilled to isolate olefin streams for back feeding to the displacement operations. It will be apparent that such mixing before fractionation is not sacramental. Thus, separate olefin fractionation sections can be provided for the olefins developed in the A and B displacement reactions, and the fractions thus separately isolated can be blended to provide the feeds to the displacement reactions.

Similarly, side streams of olefins can be withdrawn from the olefin fractionation section or sections if needed as concurrent products. In such instances, steady state operation of the process will require replacement of the olefins thus removed with supplemental ethylene to the chain growth reaction, or make-up olefins to the A displacement reaction, or both.

Figure 4:
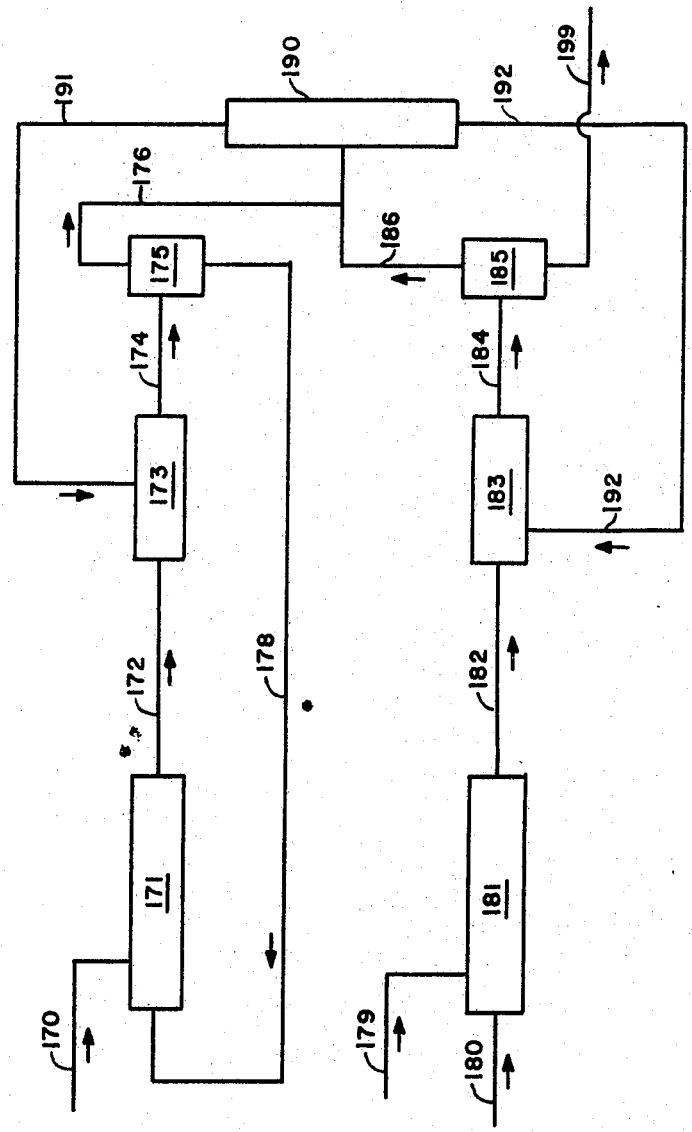

Still an additional class of embodiments are those wherein two separate chain growth operations are provided, but one is used in conjunction with one of the displacement reactions employing a closed loop circulation of trialkyl aluminum components. A typical installation of such an embodiment is schematically illustrated in FIG. 4. Referring to FIG. 4, only the principal segments of an installation are shown, including a primary chain growth reactor 181, a secondary chain growth reactor 171, displacement reaction sections 173, 183, olefins recovery units 175, 185, and an olefin fractionation system 190.

In operations of this class of embodiments, fresh low alkyl-trialkyl aluminum is provided through line 180, along with an ethylene feed through line 179. The chain growth trialkyl aluminum product is passed through line 182, for treatment in the displacement reactor 183, by a substantial excess of high olefins provided through line 192. The effluent discharged through line 184 then includes olefins, altered in composition by enrichment in lower olefins, and high alkyl-trialkyl aluminum components of the desired composition. The olefin segment is substantially recovered in the recovery section 185, leaving a trialkyl aluminum product concentrate for transmittal through line 199. The olefins are passed through line 186 to an olefin fractionation section.

The secondary chain growth reactor 171 is fed a recycled low alkyl-trialkyl aluminum mixture through line 178 which is subjected to chain growth with ethlene provided through line 170. The effluent chain grown trialkyl aluminum is passed through line 172 to the second displacement reactor 173, wherein it is subjected to displacement by low olefins provided through line 191. The effluent mixture, including olefins substantially enriched in higher olefins as a result of a displacement, is passed to the recovery unit 175, which separates a substantial fractionation of the olefin components and transmits them through line 176 to the olefin fractionation section 190.

It will be understood that substantial auxiliary equipment for operation are required in an actual plant, including, illustratively, flash chambers for separation of excess ethylene and low olefins for recycle to the chain growth operations, condensers, valves, etc. It is seen that in the foregoing class of embodiments, the combination of the secondary chain growth and secondary displacement operations utilizes a circulating supply of trialkyl aluminum materials which do not mingle with the trialkyl aluminum converted to product in the primary chain growth reactor 181 and the primary displacement reactor 183.

In a typical example of this class of embodiments, the feed to the primary chain growth reactor is triethyl aluminum and the high olefins stream provided for displacement in the primary displacement 183, is a stream concentrated in dodecene through octadecene normal alpha olefins. In the secondary chain growth reaction, the recirculated trialkyl aluminum provided through line 178 consists essentially of trialkyl aluminum compounds predominating in butyl through decyl groups, a typical mole percent distribution of the alkyls being

| | Mole percent |
|---|---|
| Butyl | 5.7 |
| Hexyl | 16.5 |
| Octyl | 31.1 |
| Decyl | 46.7 |

The details of operation of the chain growing reactions, employed in all embodiments of the process, are generally known in the art. For example, chain growth operations are described by Belgian Patents 597,315 and 553,721, and U.S. Patents 2,826,598 and 2,977,381. Generally, the operation of the chain growth reactors is carried out between about 90 to 150° C. at a pressure of 500 to 3,000 pounds per square inch. In preferred operations, as in Examples 1 and 2, the reactors are maintained at about 100 to 120° C. and at a pressure of about 1,200 to 2,000 pounds per square inch. The residence time required varies according to the amount of ethylene to be reacted, but will usually be in the order of a fraction of an hour to twenty hours, a preferred range being 20 minutes to six hours or even 20 minutes to 2 hours. Frequently, an extended length tubular reactor is employed. It will be understood that the process is not limited to a specific chain growth reactor design. Thus, if more efficient, several individual reactors can be placed in series, or in parallel, for effecting one or both of the chain growth reactions. It is generally desirable to use ethylene in excess of about 25 to 100 percent of that required.

The displacement reactions are also known. Typical operating conditions are temperatures of about 270 to 330° C. with pressure of from about 100 to about 800 pounds per square inch, a preferred range being from 200 to 600 pounds per square inch and even 400 to 600 lbs./sq. inch. The second displacement reaction is desirably carried out at lower pressures being from 15 to 200 pounds per square inch, a preferred range being 15 to 100 pounds per square inch.

The details of a highly effective displacement reaction technique are shown in Belgian Patent 594,803 which is a solely thermal reaction. It will be appreciated that catalytic operations are effective and can be used, catalysts of the nickel type frequently being used. It will be appreciated, as previously illustrated, that the relative concentration of specific olefins is not greatly changed in the displacement reactions, owing to the usual use of a substantial excess of olefins. Further, as the trialkyl aluminum fed to each displacement operation is a chain growth mixture, only a portion of its alkyl groups will differ from the principal components of the olefin feed stream. Effluents from a high temperature displacement reaction step should usually be rapidly cooled sufficiently to terminate reaction.

The oxidation of trialkyl aluminum products, in those preferred embodiments of the operation which are integrated with the oxidation and hydrolysis, to provide an alcohol product, is also generally known in the art. Thus, the oxidation operation is described in Ziegler Patent 2,892,858, and in patents 3,016,397 and 3,042,696. Generally, the preferred conditions employed are 50 to 70° C. and a total pressure of about 15 to 100 pounds per square inch.

The hydrolysis of aluminum alkoxides, formed in the oxidation step and separated from the olefins by the fractionator 75, in the most preferred embodiments, is also well understood in the art and is described in Ziegler Patent 2,892,858. The hydrolysis is preferably conducted with a dilute inorganic acidic solution at a temperature of about 80 to 120° C., although alkaline reactants in aqueous solution can be used.

Instead of a single flash zone operation following the displacement reactions, as shown in FIG. 2, FIG. 3, and FIG. 4, a two or three stage simple flashing operation at decreasing pressures is frequently desirable. Thus, instead of a single flashing operation in flashing chamber 34 at about 110° C. and the low pressure of 10 millimeters mercury, it is frequently desirable to provide a three stage flashing operation at one atmosphere, one-sixth atmosphere, and about one-seventieth atmosphere.

Small quantities of alpha olefins are consumed to produce internal olefins and branched olefins during chain growth and displacement. Usually olefins produced as a by-product of the chain growing operation are sufficient in number to compensate for those lost to internals and branched chains. Internals and branched chain olefins are usually allowed to build-up in the circulating inventories of olefins until a small purge stream removes them from the system. Clean-up of the olefin circulating streams by separating the non-vinyl olefins is possible but is not usually economical.

Figure 5:
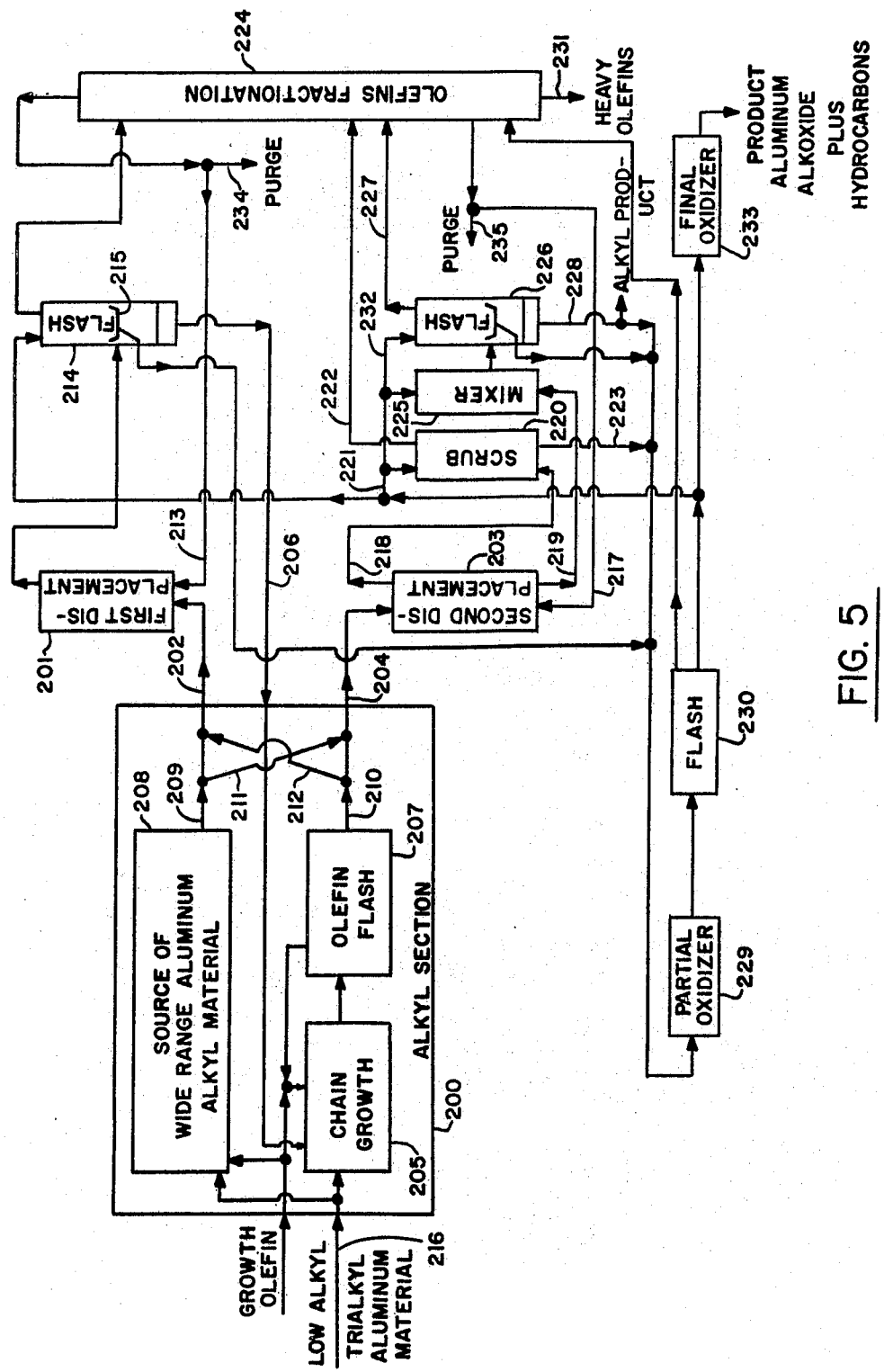
FIG. 5 is a flow sheet illustrating handling and derivation of olefins streams to minimize degradation by side reactions such as isomerization and dimerization.

With reference now to FIG. 5 of the drawings, preferred arrangements for minimizing degradation of the circulating olefins system by undesired side reactions such as isomerization and dimerization are shown in a system emphasizing the utilization of peaked aluminum trialkyls to produce product aluminum trialkoxides or "alcoholates." The apparatus of FIG. 5 embodies fundamentals of the preceding with regard to the olefin bank aspect and with regard to the alkyls manipulations such as the twin-displacement aspect and the regrowth aspect. Like the other arrangements heretofore discussed, the system of FIG. 5 accommodates considerable variety in the configuration of the portions that provide the aluminum alkyl material fed to the displacements. The system for providing the alkyls in one of its simplest form is a single form is a single chain growth operation on a mixture of a feed lower alkyl-trialkyl aluminum material and a recycle trialkyl aluminum material having alkyl group whose lengths are desired to be increased. This single growth provides a single product which is sub-divided for use in the displacements. To expand upon this and coordinate previous discussion in this regard, such a single chain growth operation can be conducted in a single environment or in plural similar environments with similar materials. Plural chain growth is usually preferably conducted in separate environments for different materials such as one or more for the feed low alkyl-trialkyl aluminum material and an additional one or more for the generally longer chain recycle material. This permits achieving a different average number of moles of growth olefin, such as ethylene, adding to the different materials. In the case of separate growth systems for the feed low alkyl-trialkyl material and for the recycle material, considerable variation is possible to achieve the most effective utilization of the systems for a given situation since one or the other trialkyl aluminum growth products or parts of both may be fed to either of the subsequent separate displacement operations heretofore discussed as "first" displacement with light olefins and "second" displacement with heavy olefins.

For analysis of others of the disclosed arrangements of the chain growth and displacement operations disclosed herein, it is evident that, in actuality, chain growth is required as such only with regard to the build-up of the "light" alkyl groups formed in the recycle trialkyl aluminum material as a result of the displacement with light olefins. Thus, the system does not require a chain growth in connection with the low alkyl-trialkyl aluminum feed material but advantageously uses suitable feed material obtained from such a system or from some other system or purchased independently, or the like. As an example, it is abundantly clear that a wide range alkyl aluminum feed material can be produced by the addition of corresponding olefins with or without concurrent displacement using appropriate alkyl aluminum compound such as TIBA (triisobutyl aluminum) or DEAH (diethyl aluminum hydride). A wide range mixture of vinyl alpha olefins is used such as olefins ranging from about 4 to 16 carbon atoms per molecule corresponding to aluminum alkyls ranging from 4 to 16 carbon atoms per alkyl group, or preferably olefins ranging from about 8 or 10 to about 16 carbon atoms per molecule, or the like.

Thus, FIG. 5 contains a broadly defined component designated "alkyl section" identified by reference character 200. This alkyl section is employed for producing alkyl aluminum materials subjected to displacement in the twin-displacement peaking operation.

The so-called "first" displacement 201 is fed by alkyl aluminum material from line 202 leading from the alkyl section 200. This material is a wide range distributed aluminum alkyl first mixture having some alkyl components in the desired product range (carbon atoms content) and some "smaller"; i.e., having fewer carbon atoms per alkyl (alkoxide) group. Similarly, the so-called "second" displacement 203 is fed by alkyl aluminum material from line 204 obtained from the alkyl section 200.

For convenience in illustrating the present discussion, the alkyl section 200 is internally divided into two main similar or different portions and contains cross-over lines for switching, for mixing or for blending the respective outputs of these portions. Thus, the alkyl section 200 typically includes at least one chain growth operation 205 whereby a growth olefin such as ethylene, propylene, butylene, or the like, is grown upon a recycle wide-range trialkyl aluminum material delivered to the alkyl section through line 206. The purpose of this chain growth operation 205 is to increase the average number of carbon atoms in the alkyl groups contained on the trialkyl aluminum material of line 206 which in general average fewer carbon atoms per alkyl group than the average in the feed alkyl aluminum material to the "low olefins" displacement 201. This chain growth 205 is fundamentally an important aspect of the present invention and of the true "twin-displacement" concept generally; however, it is to be understood that such "growth" or "regrowth" can be performed in several ways and under a variety of conditions depending upon a specific combination of feed materials and desired products and that it may be coordinated with other systems.

A conventional adjunct to chain growth 205 is an olefin flash 207 which in a reduced pressure operation removes excess or residual unreacted growth olefin and other "light" materials from the effluent from the chain growth operation and delivers the removed material to some suitable point such as recycle of the growth olefin to the chain growth 205 through a suitable compressor system contained in 207 but omitted from specific detailed showing in the drawing to avoid undue complexity.

In addition to the chain growth and flash components 205 and 207, the alkyl section 200 illustrates the presence of a second aluminum alkyl system identified by reference character 208. In general, the "source" 208 in its most straightforward, most effective and most preferred arrangement includes additional separate chain growth and flash operations similar to 205 and 207, just described. By providing such a separate growth arrangement, it is possible to achieve better control of the growth in 205 particularly and thereby enhance the overall peaking capabilities of the system. In general, the fundamental requirement for source 208 is that it provide trialkyl aluminum materials having a wide range of molecular weight or variety of carbon atoms in the moieties (al–R) where al is ⅓ of an aluminum molecule.

The reason for emphasizing the desirability of the wide range aspect of the product of the source 208 is that, if one had the capability of *cheaply* producing a narrow range material at such a point in the *first* place, there would be less of an incentive for the employment of the twin-displacement system that follows for the peaking which is the fundamental concept of the present invention. In general, this wide range aspect is also pertinent in discussions of systems employing the rather special displacement or addition materials such as TIBA and DEAH where comparatively easy complete "displacement" or "addition" plus the comparatively easy fractionation of feed olefins even into single molecular weight streams could make molecular weight peaking of aluminum alkyls appear to be easy from a technical viewpoint despite its generally poor competitive position, cost-wise, in comparison to a twin displacement system. Thus, in general, the source 208 is a system which inherently and unavoidably is of a type which provides a wide range aluminum alkyl material having some alkyl groups in the product range and some below.

The aluminum alkyl materials from source 208 and flash 207 are delivered through lines 209 and 210 to ultimately reach at least in part at least one of the subsequent utilization components of the system, particularly the "first" and "second" displacement operations 201 and 203.

For reasons which have been explained heretofore, enhanced control over material balances, sharpness of peaking of product, and the like, can be facilitated in appropriate instances by controlling the identity and proportions of the two usually somewhat different molecular weight aluminum alkyl materials to the first and second displacements from the two lines 209 and 210. In some instances, this means a preference for the delivery of alkyl aluminum material containing minimum quantities of lower alkyl groups to the "second" displacement 203, signifying a predominance of material from line 210. The thought behind this is to minimize the total number of lower alkyl groups going to the effluent from the "second" displacement which is not involved in further recycle or regrowth. It is, of course, evident that where the alkyl section 200 employs a single chain growth operation in a *single* environment or in several separate environments involving similar feeds and olefin/alkyl growth ratios, or where the effluents from dissimilar growths are blended and the split up for 201 and 203, that the feeds in lines 202 and 204 will be virtually identical.

To provide complete flexibility in the manipulation of the materials from lines 209 and 210, cross-over lines 211 and 212 are provided whereby the material of lines 209 and 210 may be delivered directly to lines 202 and 204 or inversely or mixed into the two lines 202 and 204 in different desired proportions. In this connection, one typical and particularly preferred arrangement is that wherein a controlled portion of the material of line 210 is delivered to line 202 through line 212 and wherein line 211 is blocked. In such a circumstance, line 212 is similar to line 48 of FIG. 2.

The general aspects of the subjecting to displacement operation of the first displacement 201 have been discussed at considerable length in the preceding, it being evident that in general one uses a wide range distributed aluminum alkyl first mixture having some alkyl groups in a desired alkoxide product range (in terms of number of carbon atoms contained in the groups) and some smaller groups together with "first" olefins from line 213 which contain a higher percentage of corresponding components or molecules below the corresponding alkyl range (in terms of carbon atoms per alkyl group) of the desired product alkoxides than exist in the wide range distributed aluminum alkyl first mixture. In general, this means that the olefins used in this displacement average fewer carbon atoms per molecule than the average number of carbon atoms in the individual alkyl groups of the alkyl aluminum material used. Thus as "displacement," "partial substitution," or "redistribution" or "transalkylation" (whatever one chooses to call the overall result) progresses, one obtains an increase in the quantity of *lower* alkyl groups attached to the aluminum molecules or in the moieties accompanied by an enrichment of the olefins in heavier (higher molecular weight) components due to the "higher" average carbon atom content of alkyl groups removed from the aluminum.

The first displacement is preferably performed in a co-current manner in accordance with U.S. Patent 3,359,292 and preferably uses an olefin molecule/alkyl group ratio much higher than 1:1, typically 4:1, 10:1 or higher.

The product of this first displacement is second olefins enriched on a percentage basis relative to that first olefins as to components corresponding to the desired product alkoxide range and an aluminum alkyl second mixture depleted as to components in said alkoxide range relative to said first mixture.

In general, the olefins and alkyl products of the first displacement provide a mixture which approaches individual different equilibria for each carbon atom per molecule or per alkyl group combination.

The olefins and alkyls from the first displacement are separated at least partially into two different components for separate handling, olefins going mainly to the "bank" system, alkyls going to regrowth. Separation of these portions gives attention to certain details to minimize degradation of the olefins by side reactions such as isomerization and dimerization which are frequently catalyzed by aluminum alkyls at the elevated temperatures required to separate olefins from alkyls by vaporization. Thus, the flash 214 is preferably conducted with a "wash" type of operation with a suitable reactant capable of inactivating this catalysis. Typically, a suitable reactant is a mixed aluminum dialkoxide alkyl or aluminum trialkoxide whose groups correspond approximately in terms of carbon atoms per group to those of the product alkoxides. This reactant converts residual alkyl aluminum material in the olefins taken overhead to aluminum species having an average of at least one alkoxide group per aluminum atom which is not catalytic, thereby preventing the carryover of catalytic aluminum alkyl material into the olefins recirculation and fractionation system where a minor amount can degrade the vinyl olefins at a rapid rate.

Typically, therefore, the aluminum alkoxide "wash" material is sprayed into the top of the vessel of flash 214 to travel as a spray in a countercurrent fashion relative to ascending olefins which are largely in the vapor phase to scrub out the aluminum alkyl material of either vapor or liquid phase. The resulting aluminum species is caught by a transverse partition or perforated tray 215 which permits the upward flow of vapor phase olefins but prevents the further downward flow of alkoxides to block the alkoxides from entering the main aluminum alkyl second mixture withdrawn from a reboiler portion of the flash 214 and which is delivered through line 206 to regrowth (chain growth 205). A detailed discussion of the various considerations involved in this alkoxide wash manipulation of the flash 214 is contained in allowed copending application S.N. 634,015, filed Mar. 16, 1967, and now U.S. Patent No. 3,400,170, in the names of John K. Presswood and Walter E. Foster.

One aspect of the flash 214 is that it requires consideration of overlapping boiling points of olefins and alkyls so that, as a practical matter, some of the heavier olefins liberated from the alkyls by the first displacement 201 will inevitably remain with the alkyls recycled through line 206. These include some of the olefins corresponding to the product alkoxide range (typically $C_{12}$–$C_{16}$). Normally, these and those which are even heavier do not create a sufficiently serious problem as long as their presence is recognized in computing olefins proportions in the subsequent displacement 203 and in making provision for separations at appropriate points.

The aluminum alkyl second mixture obtained from the first displacement 201 via flash 214 is recycled through line 206 to chain growth 205 where it is subjected to chain growth (regrowth) to increase the average size of the alkyl groups thereof producing an aluminum alkyl third mixture. It is characteristic of the present system that a balanced type of operation is preferably employed seeking to produce as an intermediate to the alkoxide a peaked trialkyl aluminum material whose alkyl groups are substantially higher than those in the feed material of line 216 or those of the recycle material of line 206. It is evident; however, that for other reasons such as cooperation with other apparatus or the like, it may be desired to withdraw a side stream of a portion of the material of line 206. This material is valuable for use in many ways in auxiliary apparatus. On the other hand, in the important aspect of controlling material balances, one sometimes desires to effect an auxiliary return of some of this material to some point of the present system other than chain growth 205, such as to one or the other of the first displacements 201 and 203. On this same line, such auxiliary return of portions of other materials such as the materials of lines 209 and 210, to additional other points is frequently found to be advantageous. Again the reason for such auxiliary returns is to maintain an optimized balance in the system in consideration of the particular molecular weight range of the product desired but for the most part a preferred arrangement is that wherein the entire bottoms stream from the flash 214 is delivered to the chain growth 205 and contains little, if any, olefins of $C_{10}$ and below with minor quantities of olefins of the range of 12–16 carbon atoms per molecule that correspond to the typical peaked product alkoxide of the range of 12–16 carbon atoms per group or moiety.

In the illustrated separate processing of the aluminum alkyl feed mixtures for the displacements 201 and 203 selected for exemplification by FIG. 5, at least a part of the aluminum alkyl third mixture from flash 207 is subjected to displacement in the second displacement 203 with third olefins which are concentrated as to olefin components corresponding to the alkoxides (same number of carbon atoms in olefins as in individual alkoxide groups) of the desired product alkoxide range.

The second displacement 203 is preferably performed in a counter-current manner as described in allowed U.S. patent application S.N. 521,625, filed Jan. 19, 1966, and now U.S. Patent No. 3,389,161, in the names of Gerald W. Kottong and Oran A. Ritter. In accordance with the counter-current displacement technique, third olefins concentrated as to components corresponding to the desired product alkoxide range are supplied to the displacement 203, at least in part through line 217 at one end of the displacement zone, while the aluminum alkyl third mixture plus any source material or first mixture material from line 211 and olefins carried through from line 206 or otherwise deliberately added is supplied through line 204 at the opposite end of the displacement zone. Displaced "fourth" olefins, in general, travel upward in the vapor phase in the displacement 203 even some olefins corresponding to product alkoxide range that entered the displacement 203 originally in the liquid phase from line 204. Such olefins leave the displacement through line 218 carrying minor amounts of residual aluminum alkyls.

Aluminum alkyl fourth mixture corresponding to product alkoxide range exits from the displacement zone primarily through line 219, again carrying residual quantities of the other material, namely heavy olefins, particularly those of $C_{20}$ and above.

One of the characteristics that makes the counter-current displacement technique superior to co-current displacement is the extent of completion of displacement or transalkylation operations even when using comparatively small quantities of displacing olefins because the system is not limited by a single mass equilibrium. Thus, the displacement 201 may use a ratio of 4:1 or higher of displacing olefin to trialkyl aluminum moieties fed (mols:moieties), or to express it alternately, 12 moles of olefins per mole of trialkyl aluminum. The counter-current operation exemplified at 203 by contrast needs little or no excess olefins (3 moles olefins per mole of trialkyl aluminum). Typically, one may use only approximately 5 percent more olefins than the amount corresponding to a 1:1 ratio of olefin molecules to alkyl groups (moieties), or 3:1 moles to moles. It will be evident that such a tremendous change in olefin feed vastly reduces the inventory of heavy olefins required in the system, and what may be even more significant in many situations, drastically reduces the volume of the recirculating streams, particularly those associated with the derivation of the third olefins.

A further advantage of the counter-current system is that it permits removal of part of the fourth olefins from the product-range aluminum alkyl fourth mixture prior to subsequent processing steps and hence further reduces volumes that must be handled by those subsequent steps.

Fourth olefins produced by displacement 203 (generally and comprehensively described) are depleted on a percentage basis relative to the third olefins as to components corresponding to the product alkoxide range and are enriched relative to the third olefins with regard to components below the product alkoxide range. This comes about by virtue of the splitting off of the lighter alkyls to form more volatile olefins of fewer carbon atoms per molecule than are in the desired product alkoxide groups and the subsequent replacement by alkyl groups corresponding to "product range" olefins. In the same vein, the aluminum alkyl fourth mixture thus produced becomes enriched or concentrated in "product range" alkyl groups.

The separation of the residual entrained materials from the part of the fourth olefins separately recovered from displacement 203 through line 218 is accomplished in a scrub 220 which employs an alkoxide treatment technique of the aforesaid copending application S.N. 634,015. To this end, the olefins of line 218 are contacted with an aluminum alkoxide material such as alkyl aluminum dialkoxide whose groups are typically of "product range" supplied through line 221. The olefins, substantially free of any aluminum alkyl contamination are then obtained from line 222. The aluminum alkoxide material is used in such proportions at to provide a total of at least one alkoxide group per aluminum atom in that system to convert all trialkyl aluminum species to at least monoalkoxide species which is of low volatility and is relatively inactive as an olefin degradation catalyst.

As a practical matter one generally uses a 2–4 times excess of alkoxide groups because the *total* aluminum alkyl content of the olefin stream is quite low in percentage so that the excess does not represent a particularly large amount. A preferred source of alkoxides for this purpose is from the oxidation system to be described subsequently and a preferred utilization for the alkoxides obtained from the scrub operation 220 is also the oxidation system to be described.

Aluminum alkyls converted to mixed alkyl alkoxy species are obtained in line 223. Depending on the molecular weights of the materials involved and upon other convenience aspects in handling the olefins of line 218, the scrub 220 is desirably configured to handle olefins as liquid in some instances, as vapor in others, and as mixed liquid and vapor in still other systems. The contacting of scrub 220, although preferably counter-current with upward flow of olefin in the vapor phase and downward flow of alkoxide species in the liquid phase where the physical conditions are appropriate, may also be in a liquid phase co-current manner followed by separation of olefin and alkoxide phases as by vaporization.

In any event, purified fourth olefins of line 222 are delivered to the olefin bank system as represented by olefins fractionation 224.

The "product range" aluminum alkyl fourth mixture part of the displacement mixture from 203, which is concentrated as to alkyl groups in the desired product alkoxide range by the second displacement 203, is processed by the addition to it of aluminum alkoxide material or an oxygenated alkyl aluminum stream in proportions to produce aluminum compounds having total alkoxide groups equal to at least those in aluminum alkoxide or at least about one alkoxide group per aluminum atom (trivalent) in the thus formed mixture. This addition is performed in a mixer 225. It should be understood that although a specific block component is shown for this mixing operation that transfer or exchange reactions are involved at this point which are normally extremely rapid and thorough to equilibrium or statistical compositions so that virtually completion of reaction is obtained in a pipe T and "drift space" pipe length leading to the next processing step, the pipe length being merely 10 to 50 diameters long. In addition, the exchange is not necessarily complete in such piping and may continue into the system or component or environment that accomplishes the said next processing step.

The mixture containing aluminum linked to alkyl groups and alkoxide groups, together with some fourth olefins is delivered to flash 226 which is basically similar in purpose, structure and operation to the previously discussed flash 214, the purpose being to vaporize or separate from the mixture at least part of the fourth olefins carried therewith to have a "bottoms" including the aluminum compounds having total alkoxide groups equal to at least those in dialkyl aluminum alkoxide. This particular operation is of the type discussed in the previously cited copending U.S. application S.N. 634,015. Olefins recovered from flash 226 are delivered through line 227 to the olefin bank system represented by olefins fractionation 224.

Aluminum compounds in the "bottoms" from flash 226 are delivered through line 228 to a partial oxidizer 229 where an oxidation is performed at a temperature of about 120–130° F. using an oxygen rontaining gas such as air or mixtures of oxygen with other inert materials such as $CO_2$ and thereby providing a mixture including aluminum compounds having total alkoxide groups about equal to those in alkyl aluminum dialkoxide.

In general, the aluminum compounds obtained from the partial oxidizer 229 may contain some additional fourth olefins, particularly those corresponding to the higher portion of the alkoxide product range and higher. In general, a significant part of these olefins are usable in second displacement 203 in the heavy olefins stream of line 217 making these additional olefins valuable materials to feed to the olefins fractionation 224. Thus, the partial oxidizer 229 is followed by a flash or distillation 230 operative generally at a pressure substantially below atmospheric pressure to remove substantially all remaining product range olefins from the alkoxide materials leaving a bottoms including aluminum compounds corresponding to about alkyl aluminum dialkoxide.

It is important to note that, since one does not return "third" olefins higher than the desired alkoxide product range through line 217, the higher olefins having 20 or more carbon atoms per molecule can be allowed to remain in the alkoxides provided it is not desired to use these as a separate higher olefins by-product stream from line 231. In general, one must realize that the operations at 226 and 230 are flashes, not fractionation, so that one does not expect these to make sharp cuts between the olefins as is generally expected of the olefins fractionation 224.

In the foregoing discussion, the mixer 225 was described as receiving an aluminum alkoxide material (generally described) for reaction with aluminum alkyls to inactivate the aluminum alkyls as catalysts for degradation of olefins prior to the subjection of the olefins to the high temperatures employed in the flash operation at 226. This is desirable for several reasons, one being because it permits the flash 226 to operate at higher temperatures and thereby flash deeper into the hydrocarbons without concern for degradation of the olefins due to the catalytic nature of aluminum trialkyls; however, it is evident that this type of operation destroys the aluminum alkyls as such. This is of no concern where the desired product is aluminum trialkoxide but it is obviously undesirable if co-product aluminum trialkyls are desired. Thus, in the event that one desires to obtain trialkyl aluminum co-product one normally does not add aluminum alkoxide containing material to the aluminum trialkyls in mixer 225 but delays this addition and delivers the aluminum trialkyls and olefins of line 219 to the flash 226 which then operates in a manner similar to flash 214 as to the use of the aluminum alkoxide containing material through line 232 to kill the aluminum trialkyls in *only* the *flashed* olefins without contaminating the aluminum trialkyl co-product of line 228 with alkoxide groups.

Thus, it is evident that in such a variation one normally does not insert aluminum alkoxide containing material into the system both at mixer 225 and at flash 226 but that the insertions at these points are alternate depending upon whether the product of line 228 is desired to be pure aluminum trialkyls or whether it is permissively an intermediate alkoxide material leading to the ultimate production of aluminum trialkoxides useful for producing alcohols.

From the foregoing, it is seen that the flash 230 accomplishes the step of vaporizing from the mixture from the partial oxidizer 229 additional olefins to leave a bottoms stream including aluminum compounds having total alkoxide groups equal to about two alkoxide groups per aluminum atom.

Although the alkyl aluminum dialkoxy material per se from flash 230 has utility in several ways such as for scrubbing olefin streams, another important large scale utility for such materials is in the production of aluminum trialkoxide compounds used for producing primary alcohols useful in the manufacture of detergent materials. Thus, frequently it is desirable to convert such dialkoxy materials to aluminum trialkoxides by an air oxidation operation conducted in the final oxidizer 233. This final oxidizer performs the step of converting to alkoxy groups substantially all the balance of the alkyl groups remaining in the aluminum compounds from the flash 230 forming aluminum trialkoxides or alcoholates, depending upon which terminology one prefers. The product from the final oxidizer 233 is primarily the aluminum trialkoxides mentioned; however, in general the oxidizer effluent contains some co-present hydrocarbon materials from residual olefins and from solvents which are frequently deliberately employed in performing the final oxidation at 233. The manipulation or handling of such hydrocarbons and solvents will be discussed in greater detail subsequently in connection with FIG. 6.

The olefin bank system is an important aspect of the present invention and although the system can be utilized for converting lower olefins to higher olefins and for producing various side streams of olefins and for receiving make-up olefins, the main purpose behind the present processing is to maintain a balanced system wherein a substantially uniform inventory of olefins is in recirculation at all times. To this end, the olefin bank which is represented at least in part by the olefins fractionation 224 receives second olefins from flash 214, fourth olefins from scrub 220 and flash 226, olefins from flash 230 and derives from at least one of them at least part of the first and third olefins of line 213 for first displacement 201 and line 217 for displacement 203, respectively.

It is evident from the operation of the system that the olefin bank system can be manipulated in numerous ways, for example, the second and fourth olefins can be delivered individually to appropriate points in a distillation tandem or can be combined and *then* distilled or the olefins can be separately distilled and *then* combined in various proportions for delivery to the lines 213 and 217. Thus, one should not seek artificial distinction or limitation in any particular squence of combining and fractionating olefins or of requiring the entire amount of any one stream to go to any specific point or be derived from any specific point of the bank system. The compositions and propertions relationships are the important considerations.

Furthermore, as regards the completeness or exclusiveness of the various olefins streams, one generally withdraws at least three olefin streams for purposes of avoiding the build-up of non-vinyl olefins and non-usable olefins in the system. Thus, one generally withdraws purge "light" olefins from line 234, withdraws purge product alkoxide range olefins from line 235 and withdraws higher than alkoxide product range olefins, which may be rich in vinyl olefins, from line 231.

In general, the volume of the purge streams is greater or lesser depending upon the extent of isomerization and dimerization taking place in the entire system; however, such degradation can be held sufficiently low to where mere venting of the purge streams 234 and 235 is acceptable. In other instances, it has been found that there can be advantage in recovering the vinyl components of the olefin streams as described in copending U.S. patent application Ser. No. 356,148, filed Mar. 31, 1964, in the names of Wayne T. Davis and Charles L. Kingrea.

Figure 6:
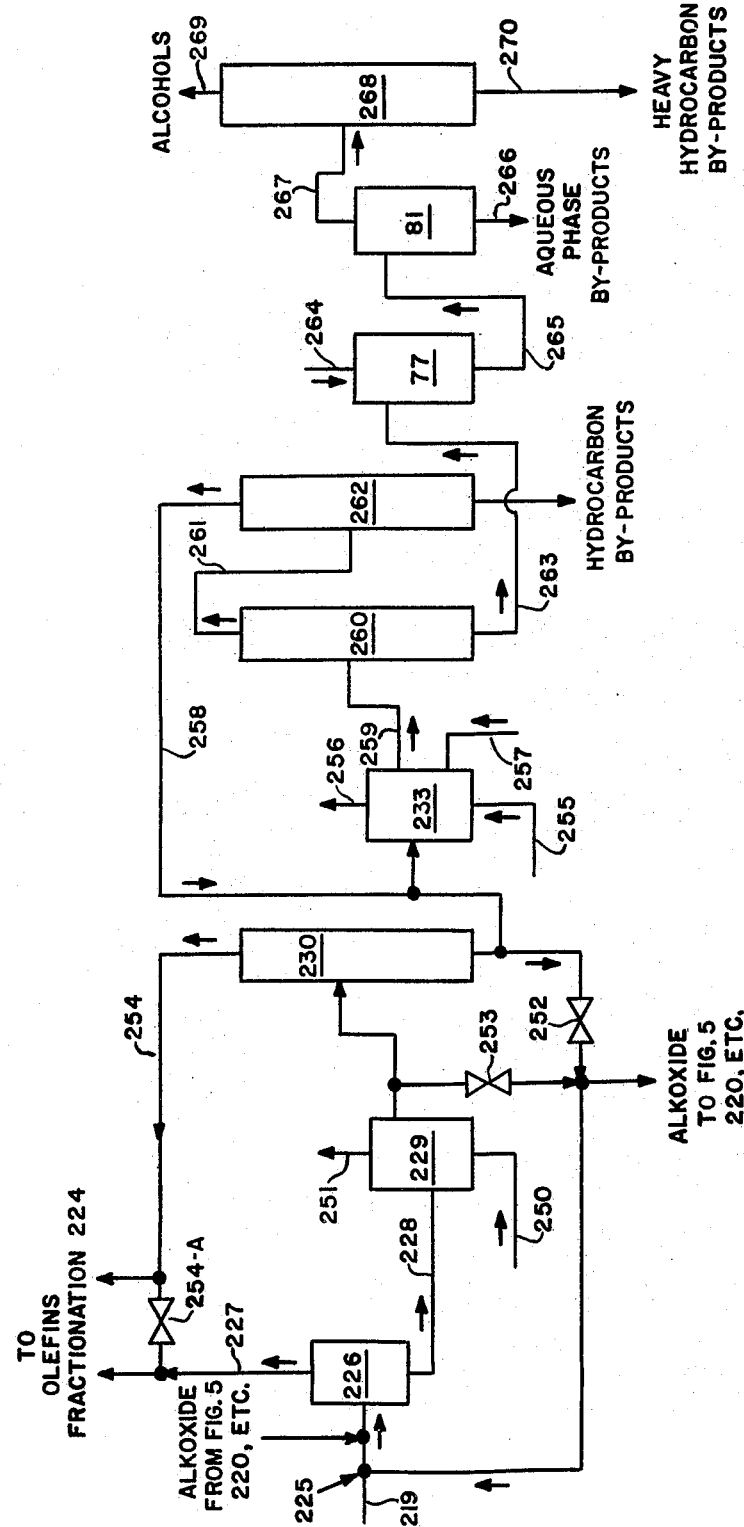
FIG. 6 is a flow sheet coordination of details in the processing of aluminum alkyls to aluminum alkoxides and the recovery of olefins from such processing.

Other details of the apparatus of FIG. 5 are shown in FIG. 6 to which attention is now directed. Some details of FIG. 5 have been omitted from FIG. 6 to concentrate attention on points under discussion. The numbering of FIG. 6 corresponds to the numbering of FIG. 5, and although some similarity may exist with regard to components of FIG. 2, a distinctive numbering system has been used in FIG. 6 to avoid confusion with similar but not identical streams and components of FIG. 2. FIG. 6 shows the mixer 225 as a mere T in line 219 leading to flash 226. The alkoxide wash of 226 is not shown. Olefins taken overhead from 226 are delivered through line 227 to 224. Aluminum material from the bottoms of 226 is delivered through line 228 to partial oxidizer 229 which receives oxidant material at line 250 and discharges oxidation by-products at line 251.

As discussed, the oxidizer 229 is a partial oxidizer in FIG. 6 in contrast to the more complete oxidation previously typified for oxidizer 71 in FIG. 2. Additional olefins, when present, are separated from the partially oxidized material in flash 230. Aluminum alkyl alkoxy material obtained from the bottoms of 230 or the same material with some olefins co-present is delivered through valve 252 or valve 253, respectively, and delivered to mixer 225.

In general, the choice as to whether the aluminum alkyl alkoxy material is obtained through valve 252 or 253 depends upon the handling of the olefins obtained as overhead from 226 and 230 in the lines 227 and 254, respectively. If the olefins of lines 227 and 254 are combined, then there usually is no particular advantage in using bottoms from 230 as aluminum alkyl alkoxy materials; however, if the two olefin streams of lines 227 and 254 are kept separate with valve 254-A closed, then there could be advantage in using the stripped alkoxide containing material from 252 for the mixer 225.

A preferred point for obtaining alkoxide containing material for the operations 214, 220, 225 and 226 of FIG. 5 is from the same stream fed to mixer 225. A preferred point of return of alkoxide containing material from those four listed operations is at the mixer 225.

In general, the oxidation of aluminum alkyls, even under the best conditions, causes some oxidative degradation of co-present olefins. Thus, in general, it may be preferable in some instances to avoid using contaminated olefins in recycle by withdrawing as much as possible of the fourth olefins from the flash 226 prior to the opportunity for the oxidative degradation of the olefins to occur. Thus, one may wish to separate the olefins of lines 227 and 254 and return the superior olefins of 227 to the system independent of the olefins of line 254.

As one gives thought to considerations such as this, it is evident that, other things being equal, with only a moderate flash at 226, the olefins of line 254 will be of generally higher molecular weight than the olefins of line 227 which may indicate the desirability for separate handling of the olefin streams for other considerations. On the other hand, if the olefins of line 254 are extremely heavy, there are instances where one deliberately mixes olefins to enhance handling characteristics of the heavier olefins of line 254.

The final oxidizer 233 is shown as receiving an oxidizing material such as air or oxygen in line 255 and discharging by-products of oxidation in line 256. The oxidizer 233 may, in addition, receive oxidation catalysts such as titanium tetrachloride in accordance with Belgian Patent 533,721 at line 257. In addition to the catalyst at line 257, the final oxidizer 233 also preferably receives an oxidation solvent such as octene-1 through line 258 which is usually desirable for purposes of reducing the viscosity of the mass. This solvent of line 258 is in a recirculation solvent recovery with distillation column 262 which will be described subsequently.

The product aluminum alkoxide from the final oxidizer 233 is delivered in line 259 to distillation column 260 which separates an overhead stream in line 261 containing volatile material such as the octene-1 oxidation solvent and other hydrocarbon materials such as the heavy olefins allowed to remain in the aluminum material effluent from flash 230. In general then, this material of line 261 contains two main components, namely the recycle solvent (octene-1) and hydrocarbon by-products. These components are separated by distillation column 262, the hydrocarbons discharged from the system and the solvent recycled through line 258 to oxidizer 233.

Bottoms from column 260 are primarily the product aluminum trialkoxide materials; however, again extremely heavy hydrocarbon materials such as olefins having 30 or more carbon atoms per molecule may be present. The alkoxide materials are delivered through line 263 to the hydrolyzer 77 which in general corresponds to hydrolyzer 77 of FIG. 2. The hydrolyzer receives a suitable hydrolyzing reagent such as aqueous sulfuric acid at line 264 to produce alcohols corresponding to the "product range" alkyls and alkoxy groups of the system, together with by-product material which in the case of sulfuric acid hydrolyzing reagent is aluminum sulfate.

Separation of aqueous and hydrocarbon phases from the hydrolysis effluent contained in line 265 is provided by a separator 81 which provides an aqueous bottoms phase at line 266 and a hydrocarbon phase in line 267, which is primarily product alcohols plus the heavy hydrocarbons carried in line 263.

Reference character 268 is employed to indicate figuratively a distillation tandem which separates product alcohols into various pure alcohols or cuts according to molecular weight in line 269 and which delivers the heavy hydrocarbon by-products, including some extremely heavy alcohol products in a bottoms line 270. Of the alcohols of line 269, one particularly preferred cut is that known as mid-range coconut predominating in normal alcohols having 12, 14 and 16 carbon atoms per molecule.

Figure 7:
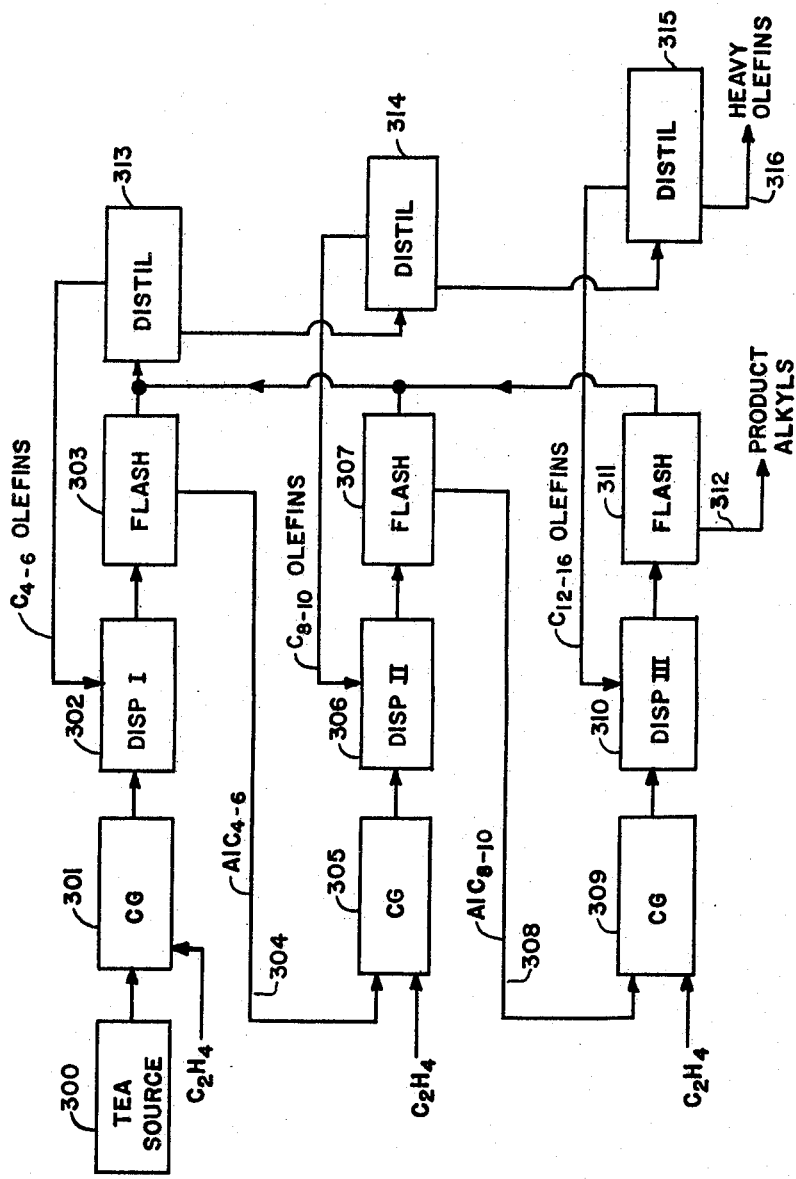
FIG. 7 is a flow sheet illustrating the use of three or more chain growth displacement tandems.

FIG. 7 shows an extension of certain features of the present invention providing sharper molecular weight peaking of the intermediates, products and derivatives.

The system of FIG. 7 contains a source of low alkyl trialkyl aluminum material, such as triethyl aluminum, indicated in general by reference character 300 which provides material for use in chain growth 301 operative with a low molecular weight growth olefin such as ethylene, propylene, butylene or the like. The product of chain growth 301 is subjected to a first displacement 302 with olefins predominating in those of 4 and 6 carbon atoms per molecule. Displacement 302 is followed by flash 303 to provide an aluminum alkyl material in line 304 which is predominantly material having moieties of 4 and 6 carbon atoms and yielding olefins enriched in olefins higher than those of 6 carbon atoms per molecule. The aluminum alkyl material is regrown in chain growth 305 and subjected to a second displacement 306 with olefins predominating in olefins having 8 to 10 carbon atoms per molecule.

The effluent of displacement 306 is flashed at 307 to provide an aluminum alkyl material in line 308 whose moieties predominate in those of 8 and 10 carbon atoms and yielding olefins predominating in olefins higher than $C_6$. The aluminum alkyl material is regrown in chain growth 309 which is followed by a third displacement 310 with olefins predominating in olenfis corresponding to the desired product alkyls or alkoxides or alcohols, namely olefins ranging from 12 to 16 carbon atoms per molecule, or slightly higher.

The third displacement 310 is followed by flash 311 to provide product range alkyls in line 312 predominating in the desired molecular weight range corresponding to moieties of 12 through 16 carbon atoms. The olefins fed to the displacements 302, 306 and 310 are derived in an olefin bank system represented by three separate distillations 313, 314 and 315 which are interconnected and which provide a by-product heavy olefin stream in line 316. In general, the by-product heavy olefins of line 316 range upward from 18 carbon atoms per molecule.

One advantage of the system of FIG. 7 is an improvement of the operation of the displacements 302 and 306 resulting from restricting the molecular weight range of the bulk of the olefins in each.

I claim:
1. A process for making aluminum trialkoxides having alkoxy groups controlled as to identity and proportions which comprises:
(a) subjecting to a first displacement a wide range distributed aluminum alkyl first mixture having some alkyl components corresponding to the desired product alkoxide range and some smaller, said displacement being with first olefins having a higher percentage of corresponding components below said alkoxide range than exist in said first mixture producing:
(1) second olefins enriched on a percentage basis relative to the first olefins as to components corresponding to said alkoxide range, and
(2) an aluminum alkyl second mixture depleted as to components in said alkoxide range relative to said first mixture;
(b) subjecting at least a part of said second mixture to chain growth to increase the average size of the alkyl groups thereof producing an aluminum alkyl third mixture;
(c) subjecting at least a part of said third mixture to displacement with third olefins concentrated as to components corresponding to said alkoxide range producing:
(1) fourth olefins depleted on a percentage basis relative to the third olefins as to components corresponding to said alkoxide range and enriched as to components below said alkoxide range; and
(2) a product-range aluminum alkyl fourth mixture concentrated as to alkyl groups in said alkoxide range;
(d) adding to at least part of the displacement mixture from (c) an oxygenated alkyl aluminum stream in proportions such that at least about one alkoxide group is provided per aluminum atom in the thus formed mixture;
(e) vaporizing from the mixture formed in (d) at least part of fourth olefins carried therewith an leaving a bottoms including aluminum compounds having total alkoxide groups equal to at least those in dialkyl aluminum alkoxide;
(f) oxidizing the said aluminum compounds in the bottoms of (e) with an oxygen containing gas and thereby providing a mixture including aluminum compounds having total alkoxide groups about equal to those in alkyl aluminum dialkoxide;
(g) vaporizing from the mixture formed in (f), additional olefins and leaving a bottoms including aluminum compounds as defined in step (f);
(h) converting to alkoxy groups substantially all of the balance of the alkyl groups remaining in the aluminum compounds from step (g) forming aluminum trialkoxides; and
(i) fractionating olefins from at least one of the second olefins from (a), the fourth olefins from (e), and the olefins from (g), to provide at least part of the first and third olefins.

2. A process for making aluminum trialkoxides having alkoxy groups controlled as to identity and proportions which comprises:
(a) subjecting to a first displacement a wide range distributed aluminum alkyl first mixture having some alkyl components corresponding to the desired product alkoxide range and some smaller, said displacement being with first olefins having a higher percentage of corresponding components below said alkoxide range than exist in said first mixture producing:
(1) second olefins enriched on a percentage basis relative to the first olefins as to components corresponding to said alkoxide range, and
(2) an aluminum alkyl second mixture depleted as to components in said alkoxide range relative to said first mixture;
(b) subjecting at least a part of said second mixture to chain growth to increase the average size of the alkyl groups thereof producing an aluminum alkyl third mixture;
(c) subjecting at least a part of said third mixture to counter-current displacement with third olefins concentrated as to components corresponding to said alkoxide range producing:
- (1) fourth olefins depleted on a percentage basis relative to the third olefins as to components corresponding to said alkoxide range and enriched as to components below said alkoxide range, said fourth olefins being continuously removed from the displacement system; and
- (2) a product-range aluminum alkyl fourth mixture concentrated as to alkyl groups in said alkoxide range;

(d) converting the trialkyl aluminum components of the fourth mixture to alkoxide containing species at least to a point where there are as many alkoxide groups present as there are aluminum atoms present producing a mixture of aluminum alkoxy alkyl materials and olefins;

(e) vaporizing from the mixture formed in (d) at least part of fourth olefins carried therewith and leaving a bottoms including aluminum compounds having total alkoxide groups equal to at least those in dialkyl aluminum alkoxide;

(f) oxidizing the said aluminum compounds in the bottoms of (e) with an oxygen containing gas and thereby providing a mixture including aluminum compounds having total alkoxide groups about equal to those in alkyl aluminum dialkoxide;

(g) vaporizing from the mixture formed in (f), additional olefins and leaving a bottoms including aluminum compounds as defined in step (f);

(h) converting to alkoxy groups substantially all of the balance of the alkyl groups remaining in the aluminum compounds from step (g) forming aluminum trialkoxides; and (i) fractionating olefins from at least one of the second olefins from (a), the fourth olefins from (e), and the olefins from (g), to provide at least part of the first and third olefins.

References Cited

UNITED STATES PATENTS

| | | |
|---|---|---|
| 3,053,905 | 9/1962 | Coyne et al. |
| 3,066,162 | 11/1962 | Ziegler et al. |
| 3,017,438 | 1/1962 | Atwood. |
| 3,104,251 | 9/1963 | Faster et al. |
| 3,309,416 | 3/1967 | Poe et al. |
| 3,359,292 | 12/1967 | Davis. |
| 3,384,651 | 5/1968 | Davis. |
| 3,389,161 | 6/1968 | Kottong et al. |
| 3,391,175 | 7/1968 | Davis. |

TOBIAS E. LEVOW, Primary Examiner

H. M. S. SNEED, Assistant Examiner